US010841598B2

(12) United States Patent
Kang et al.

(10) Patent No.: US 10,841,598 B2
(45) Date of Patent: Nov. 17, 2020

(54) IMAGE ENCODING/DECODING METHOD AND DEVICE

(71) Applicant: Electronics and Telecommunications Research Institute, Daejeon (KR)

(72) Inventors: Jung Won Kang, Daejeon (KR); Ha Hyun Lee, Daejeon (KR); Jin Ho Lee, Daejeon (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/565,558

(22) Filed: Sep. 10, 2019

(65) Prior Publication Data
US 2020/0007876 A1 Jan. 2, 2020

Related U.S. Application Data

(63) Continuation of application No. 16/136,415, filed on Sep. 20, 2018, now Pat. No. 10,455,241, which is a (Continued)

(30) Foreign Application Priority Data

Jan. 7, 2013 (KR) .................. 10-2013-0001825
Jan. 11, 2013 (KR) .................. 10-2013-0003643
(Continued)

(51) Int. Cl.
*H04N 19/187* (2014.01)
*H04N 19/70* (2014.01)
*H04N 19/30* (2014.01)

(52) U.S. Cl.
CPC ........... *H04N 19/187* (2014.11); *H04N 19/30* (2014.11); *H04N 19/70* (2014.11)

(58) Field of Classification Search
CPC ....... H04N 19/187; H04N 19/30; H04N 19/70
(Continued)

(56) References Cited

U.S. PATENT DOCUMENTS 8,938,004 B2    1/2015 Boyce et al.
2010/0158128 A1  6/2010 Kim et al.
(Continued)

FOREIGN PATENT DOCUMENTS

AU    2006233279 B2    5/2010
CN    101047857 A    10/2007
(Continued)

OTHER PUBLICATIONS

Skupin, R., "Generic HEVC High Level Syntax for Scalability and Adaptation"; Apr. 27, 2012-May 7, 2012; Geneva; (Joint Collaborative Team on Video Coding (JCT-VC) of ITU-T SG 16 WP 3 and ISO/IEC JTC1/SC 29/WG 11); 1-6. (8 pages, in English).
(Continued)

*Primary Examiner* — Allen C Wong
(74) *Attorney, Agent, or Firm* — NSIP Law

(57) ABSTRACT

Disclosed are an image encoding/decoding method and device supporting a plurality of layers. The image decoding method supporting the plurality of layers comprises the steps of; receiving a bitstream comprising the plurality of layers; and decoding the bitstream so as to acquire maximum number information about sublayers with respect to each of the plurality of layers.

8 Claims, 6 Drawing Sheets

Related U.S. Application Data continuation of application No. 15/708,967, filed on Sep. 19, 2017, now Pat. No. 10,116,946, which is a continuation of application No. 14/653,436, filed as application No. PCT/KR2014/000100 on Jan. 6, 2014, now Pat. No. 9,843,814.

(30) Foreign Application Priority Data

| | | |
|---|---|---|
| Apr. 10, 2013 | (KR) | 10-2013-0039044 |
| Jun. 21, 2013 | (KR) | 10-2013-0071845 |
| Jul. 12, 2013 | (KR) | 10-2013-0082480 |
| Jul. 23, 2013 | (KR) | 10-2013-0086839 |
| Oct. 2, 2013 | (KR) | 10-2013-0118148 |
| Jan. 6, 2014 | (KR) | 10-2014-0001045 |

(58) Field of Classification Search
USPC .................................................... 375/240.02
See application file for complete search history.

(56) References Cited

U.S. PATENT DOCUMENTS

| | | | | |
|---|---|---|---|---|
| 2013/0114707 | A1* | 5/2013 | Seregin | H04N 19/463 375/240.12 |
| 2014/0092988 | A1* | 4/2014 | Deshpande | H04N 19/30 375/240.26 |
| 2014/0098897 | A1* | 4/2014 | Rodriguez | H04N 19/463 375/240.26 |

FOREIGN PATENT DOCUMENTS

| | | |
|---|---|---|
| CN | 101326828 A | 12/2008 |
| CN | 101518086 A | 8/2009 |
| CN | 101542926 A | 9/2009 |
| CN | 101569195 A | 10/2009 |
| CN | 101653002 A | 2/2010 |
| CN | 102714725 A | 10/2012 |
| KR | 10-0388820 B1 | 6/2003 |
| KR | 10-2009-0037689 A | 4/2009 |
| KR | 10-2010-0005124 A | 1/2010 |
| KR | 10-2011-0069740 A | 6/2011 |
| WO | WO 2005/112464 A1 | 11/2005 |
| WO | WO 2008/086377 A1 | 7/2008 |
| WO | WO 2012/122246 A1 | 9/2012 |

OTHER PUBLICATIONS

Wang, Ye-Kui, "Solutions considered for NAL unit header and video parameter set for HEVC extensions," 10th Meeting of the Joint Collaborative Team on Video Coding (JCT-VC) of ITU-T SG 16 WP 3 and ISO/IEC JTC 1/SC 29/WG 11, Document: JCTVC-J1007, Jul. 11-20, 2012, Stockholm, SE, pp. 1-6.

Boyce, Jill, "VPS Syntax for Scalable and 3D Extensions"; Oct. 10, 2012-Oct. 19, 2012; Shanghai; (Joint Collaborative Team on Video Coding (JCT-VC) of ITU-T SG 16 WP 3 and ISO/IEC JTC1/SC 29/WG 11); 1-6. (6 pages, in English).

Bross, Benjamin et al., "High Efficiency Video Coding (HEVC) text specification draft 9," 11th Meeting of the Joint Collaborative Team on Video Coding (JCT-VC) of ITU-T SG16 WP3 and ISO/IEC JTC1/SC29/WG11, Document: JCTVC-K1003_V1, Oct. 10-19, 2012, Shanghai, CN (279 pages, in English).

Sato,Kazushi, "On inter-layer prediction enabling/disabling for HEVC scalable extensions," 11th Meeting of the Joint Collaborative Team on Video Coding (JCT-VC) of ITU-T SG 16 WP 3 and ISO/IEC JTC 1/SC 29/WG 11, Document: JCTVC-K0175rl, Oct. 10-19, 2012, Shanghai, CN, pp. 1-6.

Cong Thang,Truong, et al., "Proposal to Video Parameter Set and its Extension," 11th Meeting of the Joint Collaborative Team on Video Coding (JCT-VC) of ITU-T SG 16 WP 3 and ISO/IEC JTC 1/SC 29/WG 11, Document: JCTVC-K0228, Oct. 10-19, 2012, Shanghai, CN. pp. 1-7.

Cong Thang, Truong, "Proposal to the Extension of Video Parameter Set"; Jan. 14, 2013-Jan. 23, 2013; Geneva; (Joint Collaborative Team on Video Coding (JCT-VC) of ITU-T SG 16 WP 3 and ISO/IEC JTC 1/SC 29/WG 11): 1-6. (6 pages, in English)

International Search Report dated Apr. 4, 2014, in counterpart International Application No. PCT/KR2014/000100 (2 pages in English, 2 pages in Korean).

Skupin, R. et al., "Generic HEVC high level syntax for scalability and adaptation", *Joint Collaborative Team on Video Coding (JCT-VC) of ITU-T SG 16 WP 3 and ISO/IEC JTC 1/SC 29/WG 11*, 9th Meeting: Geneva, Switzerland, Apr. 27-May 7, 2012 (pp. 1-7).

Skupin, R. et al., "AHG9/AHG10: Design of the Video Parameter Set", *Joint Collaborative Team on Video Coding (JCT-VC) of ITU-T SG 16 WP 3 and ISO/IEC JTC 1/SC 29/WG 11*, 10th Meeting: Stockholm, Sweden, Jul. 11-Jul. 20, 2012 (pp. 1-18).

Wang, Ye-Kui, "Solutions considered for NAL unit header and video parameter set for HEVC extensions", *Joint Collaborative Team on Video Coding (JCT-VC) of ITU-T SG 16 WP 3 and ISO/IEC JTC 1/SC 29/WG 11*, 10th Meeting: Stockholm, Sweden, Jul. 11-Jul. 20, 2012 (pp. 1-6).

Boyce, Jill, "VPS syntax for scalable and 3D extensions", *Joint Collaborative Team on Video Coding (JCT-VC) of ITU-R SG 16 WP 3 and ISO/IEC JTC 1/SC 29/WG 11*, 11th Meeting: Shanghai, China, Oct. 10-19, 2012 (pp. 1-6).

Sato, Kazushi, "On inter-layer prediction enabling/disabling for HEVC scalable extension", *Joint Collaborative Team on Video Coding (JCT-VC) of ITU-T SG 16 WP 3 and ISO/IEC JTC 1/SC 29/WG 11*, 11th Meeting: Shanghai, China, Oct. 10-19, 2012 (pp. 1-6).

Rusert, Thomas et al., "Parameter set design for HEVC extensions", *Joint Collaborative Coding (JCT-VC) of ITU-T SG 16 WP 3 and ISO/IEC JTC 1/SC 29/WG 11*, 11th Meeting: Shanghai, China, Oct. 10-19, 2012 (pp. 1-6).

Thang, Truong Cong et al., "Proposal to Video Parameter Set and its Extension", *Joint Collaborative Team on Video Coding (JCT-VC) of ITU-T SG 16 WP 3 and ISO/IEC JTC 1/SC 29/WG 11*, 11th Meeting: Shanghai, China, Oct. 10-19, 2012 (pp. 1-7).

Thang, Truong Cong et al., "Proposal to the Extension of Video Parameter Set", *Joint Collaborative Team on Video Coding (JCT-VC) of ITU-T SG 16 WP 3 and ISO/IEC JTC 1/SC 29/WG 11*, 12th Meeting: Geneva, Switzerland, Jan. 14-23, 2013 (pp. 1-6).

* cited by examiner

IMAGE ENCODING/DECODING METHOD AND DEVICE

CROSS-REFERENCE TO RELATED APPLICATIONS

This application is a continuation of application Ser. No. 16/136,415 filed on Sep. 20, 2018, which is a continuation of application Ser. No. 15/708,967 filed on Sep. 19, 2017, now U.S. Pat. No. 10,116,946 issued on Oct. 30, 2018, which is a continuation of application Ser. No. 14/653,436 having a 371(c) date of Jun. 18, 2015, now U.S. Pat. No. 9,843,814 issued on Dec. 12, 2017, which is a U.S. national stage application of International Application No. PCT/KR2014/000100 filed on Jan. 6, 2014, which claims the benefit of Korean Patent Application Nos. 10-2013-0001825 filed on Jan. 7, 2013, 10-2013-0003643 filed on Jan. 11, 2013, 10-2013-0039044 filed on Apr. 10, 2013, 10-2013-0071845 filed on Jun. 21, 2013, 10-2013-0082480 filed on Jul. 12, 2013, 10-2013-0086839 filed on Jul. 23, 2013, 10-2013-0118148 filed on Oct. 2, 2013, and 10-2014-0001045 filed on Jan. 6, 2014, in the Korean Intellectual Property Office, the entire disclosures of which are incorporated herein by reference for all purposes.

TECHNICAL FIELD

The present invention relates to picture encoding and decoding, and more particularly, to picture encoding and decoding based on scalable video coding (SVC).

BACKGROUND ART

In recent years, while a multimedia environment has been built up, various terminals and networks have been used and the resulting use requirement has been diversified.

For example, as a performance and a computing capability of a terminal have been diversified, a supported performance has also been diversified for each apparatus. Further, in the case of a network in which information is transmitted, a pattern, an information amount, and a transmission speed of the transmitted information, as well as an external structure such as wired and wireless networks have been diversified for each function. A user has selected a terminal and a network to be used according to a desired function and further, spectrums of a terminal and a network which an enterprise provides to the user have been diversified.

In this regard, in recent years, as a broadcast having a high definition (HD) resolution has been extended and serviced worldwide as well as domestically, a lot of users have been familiar with a high definition picture. As a result, a lot of picture service associated organizations have made a lot of efforts to develop a next-generation picture apparatus.

Further, with an increase in interest in ultra high definition (UHD) having four times higher resolution than an HDTV as well as the HDTV, a requirement for technology that compresses and processes a higher resolution and higher definition picture has been further increased.

In order to compress and process the picture, inter prediction technology of predicting a pixel value included in a current picture from a temporally prior and/or post picture, intra prediction technology of predicting another pixel value included in the current picture by using pixel information in the current picture, and entropy encoding technology of allocating a short sign to a symbol in which an appearance frequency is high and a long sign to a symbol in which the appearance frequency is low, and the like may be used.

As described above, when respective terminals and networks having different supported functions, and the diversified user requirements are considered, a quality, a size, a frame, and the like of a supported picture need to be consequently diversified.

As such, due to heterogeneous communication networks, and terminals having various functions and various types of terminals, scalability that variously supports the quality, resolution, size, frame rate, and the like of the picture becomes a primary function of a video format.

Accordingly, it is necessary to provide a scalability function so as to achieve video encoding and decoding in terms of temporal, spatial, picturequality, and the like in order to provide a service required by the user under various environments based on a high-efficiency video encoding method.

DISCLOSURE

Technical Problem

An object of the present invention is to provide a method and an apparatus for picture encoding/decoding that can improve encoding/decoding efficiency.

Another object of the present invention is to provide a method and an apparatus that perform inter-layer switching in scalable video coding that can improve encoding/decoding efficiency.

Yet another object of the present invention is to provide a method and an apparatus that express and signal scalability information of a scalable bitstream that can improve encoding/decoding efficiency.

Still another object of the present invention is to provide a method and an apparatus that express and signal sub-layer information of a scalable layer that can improve encoding/decoding efficiency.

Technical Solution

In accordance with an aspect of the present invention, there is provided a method for picture decoding supporting a plurality of layers. The method for picture decoding supporting the plurality of layers includes: receiving a bitstream including the plurality of layers; and acquiring information on the maximum number of sub-layers for each of the plurality of layers by decoding the bitstream.

In accordance with another aspect of the present invention, there is provided a method for picture encoding supporting a plurality of layers. The method for picture encoding supporting a plurality of layers includes: acquiring information on the maximum number of sub-layers for each of the plurality of layers; and transmitting a bitstream including the information on the maximum number of sub-layers by encoding the information on the maximum number of sub-layers.

In accordance with yet another aspect of the present invention, there is provided an apparatus for picture decoding supporting a plurality of layers. The apparatus for picture decoding supporting the plurality of layers includes: a decoding unit receiving a bitstream including the plurality of layers and decoding the bitstream to acquire information on the maximum number of sub-layers for each of the plurality of layers.

In accordance with still another aspect of the present invention, there is provided an apparatus for picture encoding supporting a plurality of layers. The apparatus for picture encoding supporting a plurality of layers includes: an encoding unit deciding information on the maximum number of sub-layers for each of the plurality of layers and encoding the information on the maximum number of sub-layers to transmit a bitstream including the information on the maximum number of sub-layers.

Advantageous Effects

A method of describing extraction in a hierarchical bitstream and scalability information is provided to flexibly express various types of scalability information of a bitstream and enable efficient adaptive transformation at a packet level.

Further, various scalability information of a bitstream encoded by using hierarchical picture encoding is efficiently expressed to allow a bitstream extractor to easily extract a desired layer.

MODE FOR INVENTION

Hereinafter, embodiments of the present invention will be described in detail with reference to the accompanying drawings. In describing the embodiments of the present specification, when it is determined that the detailed description of the known art related to the present invention may obscure the gist of the present invention, the corresponding description thereof may be omitted.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Moreover, a content of describing "including" a specific component in the specification does not exclude a component other than the corresponding component and means that an additional component may be included in the embodiments of the present invention or the scope of the technical spirit of the present invention.

Terms such first, second, and the like may be used to describe various components, but the components are not limited by the terms. The above terms are used only to discriminate one component from the other component. For example, without departing from the scope of the present invention, a first component may be referred to as a second component, and similarly, a second component may be referred to as a first component.

Further, components described in the embodiments of the present invention are independently illustrated in order to show different characteristic functions and each component is not constituted by separated hardware or one software constituting unit. That is, each component includes respective components which are arranged for easy description and at least two components of the respective components may constitute one component or one component is divided into a plurality of components which may perform their functions. Even an integrated embodiment and separated embodiments of each component is also included in the scope of the present invention without departing from the spirit of the present invention.

Further, some components are not requisite components that perform essential functions but selective components for just improving performance in the present invention. The present invention may be implemented with the requisite component for implementing the spirit of the present invention other than the component used to just improve the performance and a structure including only the requisite component other than the selective component used to just improve the performance is also included in the scope of the present invention.

Figure 1:
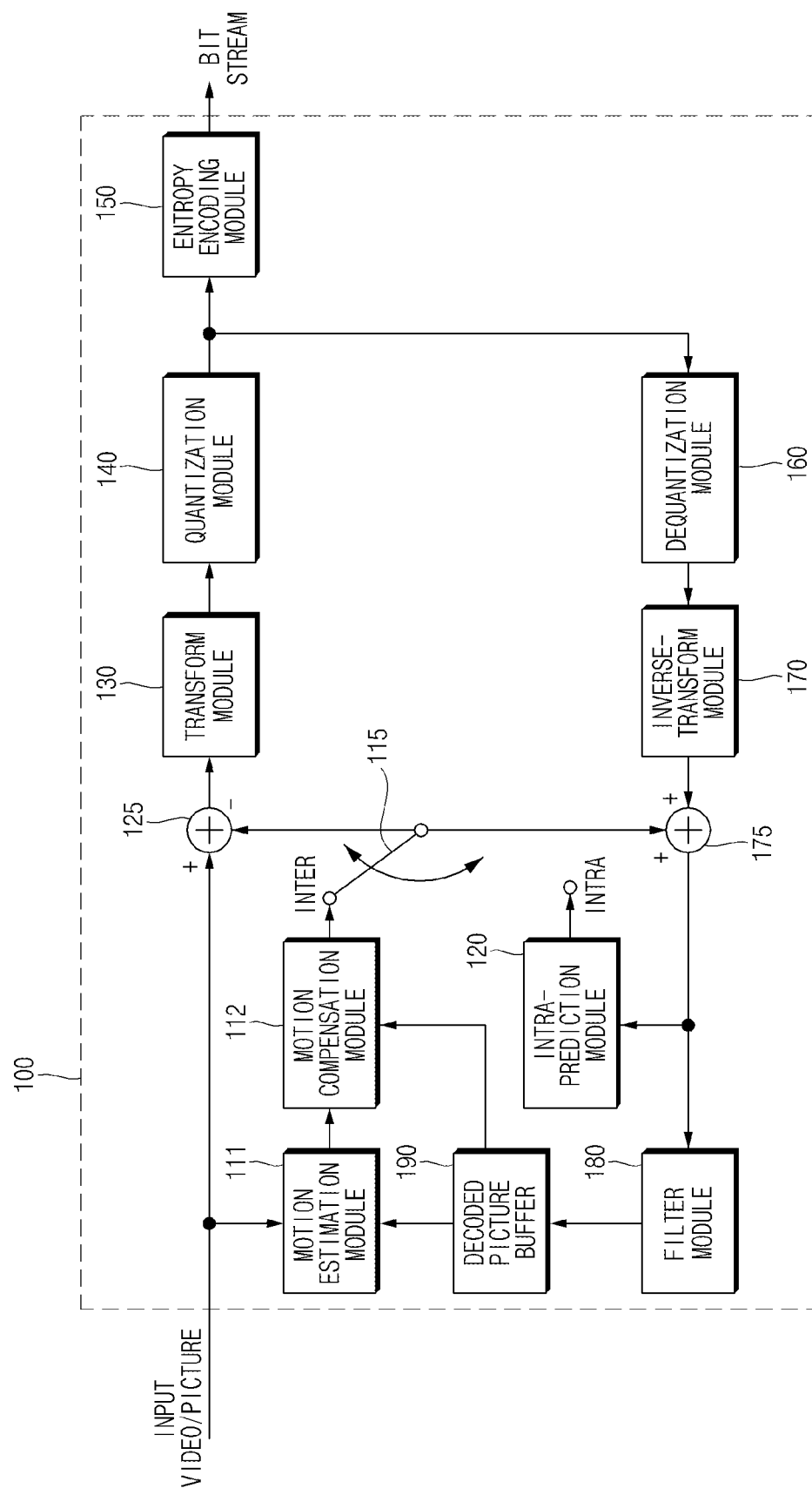
FIG. 1 is a block diagram illustrating a configuration of a picture decoding apparatus according to an embodiment of the present invention.

FIG. 1 is a block diagram illustrating a configuration of a picture decoding apparatus according to an embodiment of the present invention.

A method or an apparatus for scalable video encoding/decoding may be implemented by extension of a general picture encoding/decoding method or apparatus which does not provide scalability and the block diagram of FIG. 1 illustrates an embodiment of a picture encoding apparatus which may be a base of the scalable video encoding apparatus.

Referring to FIG. 1, a picture encoding apparatus 100 includes a motion estimation module 111, a motion compensation module 112, an intra prediction module 120, a switch 115, a subtractor 125, a transform module 130, a quantization module 140, an entropy encoding module 150, a dequantization module 160, an inverse transform module 170, an adder 175, a filter module 180, and a decoded picture buffer 190.

The picture encoding apparatus 100 may encode an input picture in an intra mode or an inter mode and output a bitstream. In the intra mode, the switch 115 may be switched to intra and in the inter mode, the switch 115 may be switched to inter. The intra prediction means an intra-frame prediction and the inter prediction means an inter-frame prediction. The picture encoding apparatus 100 may generate a predicted block for an input block of the input picture and thereafter, encode a residual between the input block and the predicted block. In this case, the input picture may mean an original picture.

In the intra mode, the intra prediction module 120 may generate the predicted block by performing a spatial prediction by using a pixel value of an already encoded/decoded block adjacent to a current block.

In the inter mode, the motion estimation module 111 may acquire a motion vector by finding an area of a reference picture stored in the decoded picture buffer 190 which most matches the input block during a motion estimation process. The motion compensation module 112 compensates for a motion by using the motion vector to generate the predicted block. Herein, the motion vector is a 2D vector used in the inter prediction and may represent an offset between a current encoding/decoding target picture and a reference picture.

The subtractor 125 may generate a residual block by difference between the input block and the generated predicted block.

The transform module 130 performs transformation for the residual block to output a transform coefficient. Herein, the transform coefficient may mean a coefficient value generated by converting the residual block and/or a residual signal. Hereinafter, in this specification, the transform coefficient is quantized and a quantized transform coefficient level may also be called the transform coefficient.

The quantization module 140 quantizes an input transform coefficient according to a quantization parameter to output a quantized coefficient. The quantized coefficient may be called the quantized transform coefficient level. In this case, the quantization module 140 may quantize the input transform coefficient by using a quantization matrix.

The entropy encoding module 150 performs entropy encoding based on values calculated by the quantization module 140 or an encoded parameter value calculated during encoding to output the bitstream. When entropy encoding is applied, the symbol is expressed by allocating a small number of bits to a symbol having a high generation probability and a large number of bits to a symbol having a low generation probability, and as a result, the size of a bitstream for symbols to be encoded may be reduced. Accordingly, compression performance of video encoding may be enhanced through the entropy encoding. The entropy encoding module 150 may use encoding methods such as exponential-Golomb, context-adaptive variable length coding (CAVLC), and context-adaptive binary arithmetic coding (CABAC) for the entropy encoding.

Since the picture encoding apparatus 100 according to the embodiment of FIG. 1 performs inter prediction encoding, that is, inter-frame prediction encoding, a currently encoded picture needs to be decoded and stored to be used as the reference picture. Accordingly, the quantized coefficient is inversely quantized by the dequantization module 160 and inversely transformed by the inverse transform module 170. The inversely quantized and inversely transformed coefficient is added to the predicted block by the adder 175 and a reconstructed block is generated.

The reconstructed block passes though the filter module 180, and the filter module 180 may apply at least one of a deblocking filter, a sample adaptive offset (SAO), and an adaptive loop filter (ALF) to the reconstructed block or a reconstructed picture. The filter module 180 may be called an adaptive in-loop filter. The deblocking filter may remove block distortion which occurs on a boundary between blocks. The SAO may add an appropriate offset value to a pixel value in order to compensate for coding error. The ALF may perform filtering based on a value acquired by comparing the reconstructed picture and the original picture. The reconstructed block which passes through the filter module 180 may be stored in the decoded picture buffer 190.

Figure 2:
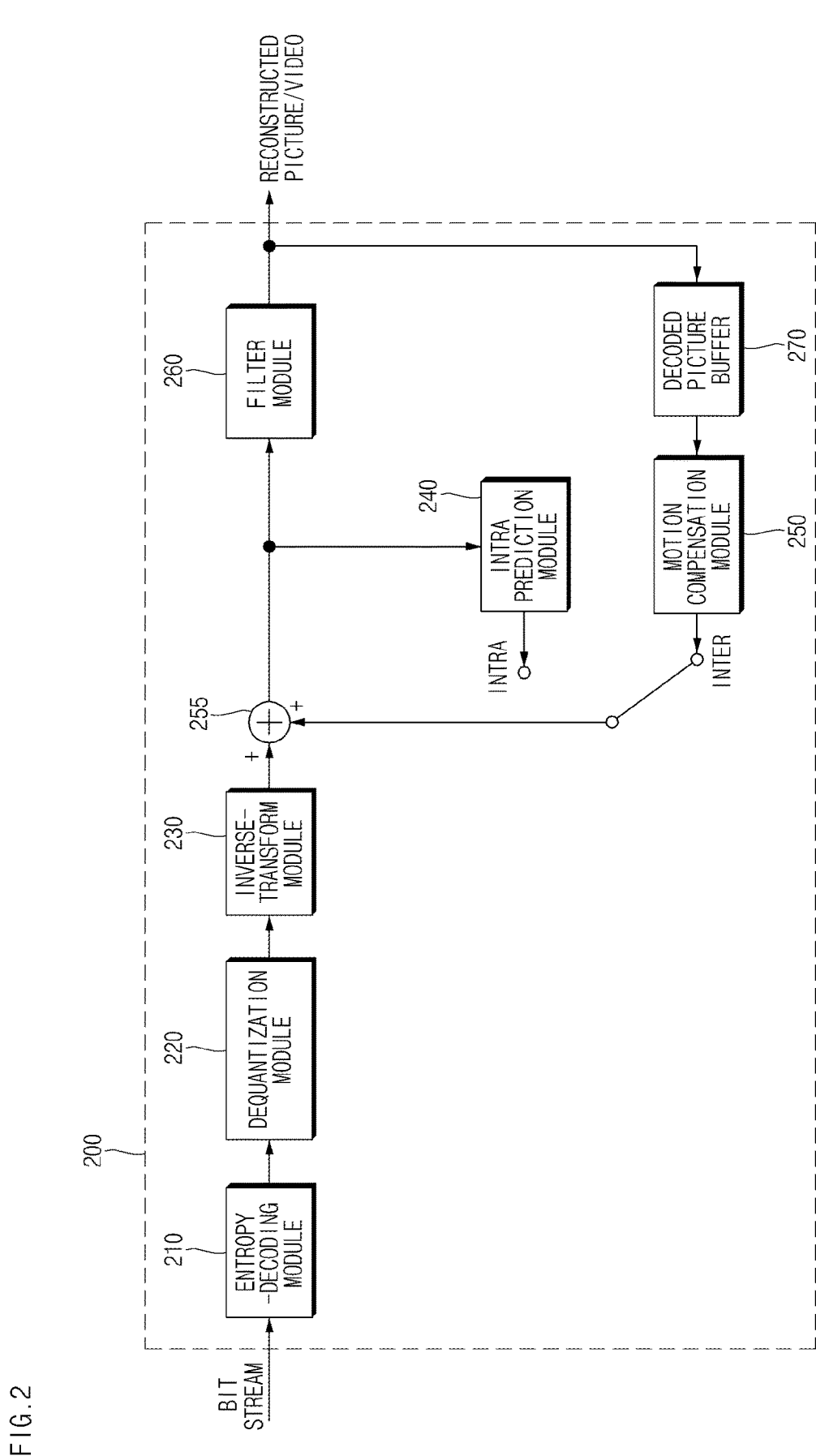
FIG. 2 is a block diagram illustrating a configuration of a picture decoding apparatus according to an embodiment of the present invention.

FIG. 2 is a block diagram illustrating a configuration of a picture decoding apparatus according to an embodiment of the present invention.

As described in detail in FIG. 1, the method or apparatus for scalable video encoding/decoding may be implemented by the extension of the general picture encoding/decoding method or apparatus which does not provide the scalability and the block diagram of FIG. 2 illustrates an embodiment of a picture decoding apparatus which may be a base of the scalable video decoding apparatus.

Referring to FIG. 2, a picture decoding apparatus 200 includes an entropy decoding module 210, a dequantization module 220, an inverse transform module 230, an intra prediction module 240, a motion compensating module 250, an adder 255, a filter module 260, and a decoded picture buffer 270.

The picture decoding apparatus 200 may receive a bitstream output by an encoder and decodes the received bitstream in the intra mode or the inter mode, and output the restore picture, that is, the reconstructed picture. In the intra mode, the switch may be shifted to 'intra', and in the inter mode, the switch may be shifted to 'inter'.

The picture decoding apparatus 200 may acquire a reconstructed residual block from the received bitstream and generate a block reconstructed by adding the reconstructed residual block and the predicted block after generating the predicted block, that is, the reconstructed block.

The entropy decoding module 210 entropy-decodes the input bit stream according to probability distribution to generate symbols including a symbol having a quantized coefficient form.

When entropy decoding is applied, the symbol is expressed by allocating a small number of bits to a symbol having a high generation probability and a large number of bits to a symbol having a low generation probability, and as a result, the size of a bitstream for each symbol may be reduced.

A quantized coefficient is inversely quantized by the dequantization module 220 and inversely transformed by the inverse transform module 230, and the quantized coefficient is inversely quantized/inversely transformed, and as a result, the reconstructed residual block may be generated. In this case, the dequantization module 220 may apply a quantization matrix to the quantized coefficient.

In the intra mode, the intra prediction module 240 may generate the prediction block by performing a spatial prediction by using a pixel value of an already decoded block adjacent to a current block. In the inter mode, the motion compensation module 250 compensates for a motion by using a motion vector and a reference picture stored in the decoded picture buffer 270 to generate the predicted block.

The residual block and the predicted block are added through the adder 255 and the added blocks may pass through the filter module 260. The filter module 260 may apply at least one of the deblocking filter, the SAO, and the ALF to the reconstructed block or the reconstructed picture. The filter module 260 may output the reconstructed picture, that is, the restore picture. The reconstructed picture is stored in the reference picture buffer 270 to be used in the inter prediction.

The constituent elements directly related to the video decoding among the entropy decoding module 210, the dequantization module 220, the inverse transform module 230, the intra prediction module 240, the motion compensation module 250, the filter module 260, and the decoded picture buffer 270 included in the video decoding apparatus 200, for example, the entropy decoding module 210, the dequantization module 220, the inverse transform module 230, the intra prediction module 240, the motion compensation module 250, the filter module 260, and the like are distinguished from other constituent elements to be expressed by the decoding unit.

Further, the video decoding apparatus 200 may further include a parsing unit (not illustrated) parsing information regarding the encoded video included in the bit stream. The parsing unit may include the entropy decoding module 210, and may also be included in the entropy decoding module 210. The parsing unit may also be implemented as one constituent element of the decoding unit.

Figure 3:
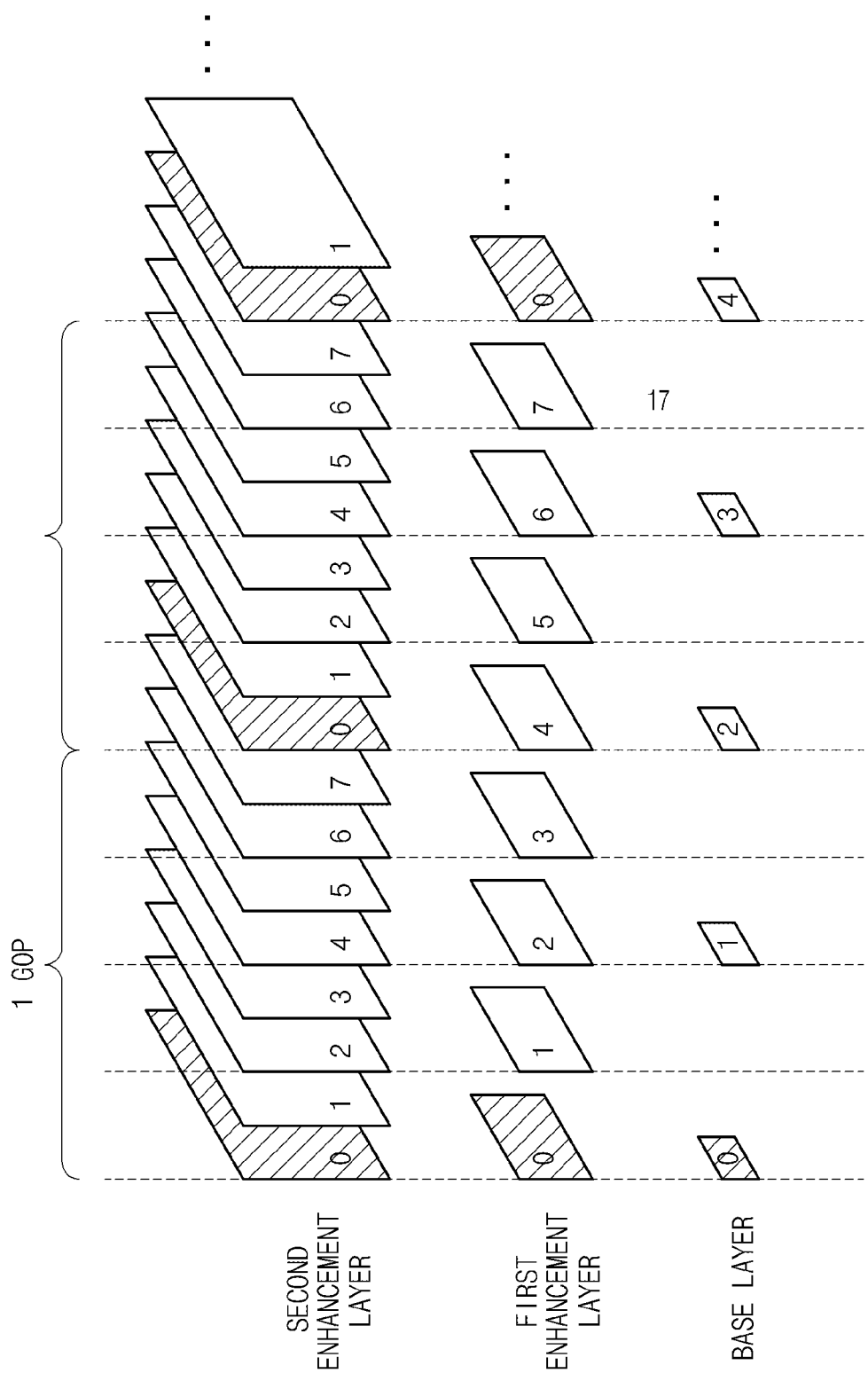
FIG. 3 is a conceptual diagram schematically illustrating one example of a scalable video coding structure using a plurality of layers according to the present invention.

FIG. 3 is a conceptual diagram schematically illustrating one example of a scalable video coding structure using a plurality of layers according to the present invention. In FIG. 3, a group of picture (GOP) represents a picture group, that is, a group of pictures.

A transmission medium is required to transmit picture data and performance thereof is different for each transmission medium according to various network environments. The scalable video coding method may be provided to be applied to various transmission media or network environments.

The video coding method (hereinafter, referred to as 'scalable coding' or 'scalable video coding') supporting the scalability is a coding method that increases encoding and decoding performances by removing inter-layer redundancy by inter-layer texture information, motion information, a residual signal, and the like. The scalable video coding method may provide various scalabilities in spatial, temporal, quality, and view terms according to surrounding conditions such as transmission bit rate, transmission error rate, a system resource, and the like.

Scalable video coding may be performed by using a multiple-layer structure so as to provide a bitstream which is applicable to various network situations. For example, a scalable video coding structure may include a base layer that compresses and processes the picture data by using the general picture decoding method and may include an enhancement layer that compresses and processes the picture data by using both decoding information of the base layer and the general decoding method.

Herein, a layer means a set of pictures and bitstreams that are distinguished based on a spatial (for example, a picture size), a temporal (for example, a decoding order, a picture output order, and frame rate), quality, complexity, view, and the like.

A base layer may be referred to as a base layer or a lower layer. An enhancement layer may be designated as an enhancement layer or a higher layer. In this case, the lower layer may represent a layer that supports lower scalability than a specific layer and the higher layer may represent a layer that supports higher scalability than a specific layer. A layer which the specific layer refers to in encoding or decoding may be referred to as a reference layer (alternatively, reference layer).

Referring to FIG. 3, for example, the base layer may be defined by standard definition (SD), 15 Hz frame rate, and 1 Mbps bit rate, a first enhancement layer may be defined by high definition (HD), 30 Hz frame rate, and 3.9 Mbps bit rate, and a second enhancement layer may be defined by 4K-ultra high definition (UHD), 60 Hz frame rate, and 27.2 Mbps.

The format, frame rate, bit rate, and the like as one embodiment may be decided differently as necessary. Further, the number of used layers is not limited to the embodiment and may be decided differently according to a situation. For example, if a transmission bandwidth is 4 Mbps, data may be transmitted at 15 Hz or less by decreasing the frame rate of the HD of the first enhancement layer.

The scalable video coding method may provide spatial, temporal, quality, and view scalabilities by the method described in the embodiment of FIG. 3.

In this specification, the scalable video coding has the same as the scalable video encoding in terms of encoding and the scalable video decoding in terms of decoding.

As described above, the scalability serves as a primary function of a present video format due to heterogeneous communication networks and various terminals. The scalability information of the bitstream is very important in order for all nodes to effectively and efficiently transform the bitstream on a content delivery path. At present, important information associated with the bitstream in a high efficiency video coding (HEVC) standard is described in a video parameter set (VPS). Further, it is very important to describe the important information associated with the bitstream, for example, extraction information and scalability information even in a video standard that extends the HEVC for providing the scalability.

Hereinafter, the present invention provides a method that efficiently expresses various scalability information of the bitstream encoded by using the scalability video encoding and allows the bitstream extractor to extract a desired layer therethrough.

Representation of Bitstream Characteristics

A description for showing a characteristic of a scalable bitstream is defined in the HEVC standard, and in the present invention, representation of the characteristic of the scalable bitstream intend to be enhanced as below in order to apply to a scalable video coding structure.

1) Time Window for Max. Bitrate Definition

Max. bitrate in the present scalable representation (representing a reconstructed picture which is scalably decodable) represents an upper bound of bitrate within a time window for 1 sec.

However, peak bitrate or picture rate information in a timescale which depends on an application may be required. For example, a certain application may require only information within a time window of 30 sec., whereas a certain application may require peak bitrate or largest-burst information within a time window of 10 sec. Therefore, a scheme to represent at least one (one or more) time window is presented as below for such a purpose.

Table 1 illustrates an embodiment of a syntax representing bitrate information within one or more time windows.

TABLE 1

|  | Descriptor |
|---|---|
| bit_rate_pic_rate_info( TempLevelLow, TempLevelHigh ) | |
| { | |
|    num_max_bit_rate_windows_minus1 | u(3) |
|    for( j = 1; j <= num_max_bit_rate_windows_minus1; j++ ) | |
|      max_bit_rate_calc_window[ j ] | u(16) |
|    num_max_pic_rate_windows_minus1 | u(3) |
|    for( j = 1; j <= num_max_pic_rate_windows_minus1; j++ ) | |
|      max_pic_rate_calc_window[ j ] | u(16) |
|    for( i = TempLevelLow; i <= TempLevelHigh; i++ ) { | |
|      bit_rate_info_present_flag[ i ] | u(1) |
|      pic_rate_info_present_flag[ i ] | u(1) |
|      if( bit_rate_info_present_flag[ i ] ) { | |
|         avg_bit_rate[ i ] | u(16) |
|         for( j = 0; j <= num_max_bit_rate_windows_minus1; j++ ) | |
|            max_bit_rate [ i ][ j ] | u(16) |
|      } | |
|      if( pic_rate_info_present_flag[ i ] ) { | |
|         constant_pic_rate_idc[ i ] | u(2) |
|         avg_pic_rate[ i ] | u(16) |
|         for( j = 0; j <= | |

TABLE 1-continued

| | Descriptor |
|---|---|
| num_max_pic_rate_windows_minus1; j++ ) | |
| max_pic_rate [ i ][ j ] | u(16) |
| } | |
| } | |
| } | |

Meanings of syntaxes illustrated in FIG. 1 are described below.

num_max_bit_rate_windows_minus1+1 represents the number of time windows used to calculate the max. bitrate.

num_max_pic_rate_windows_minus1+1 represents the number of time windows used to calculate the max. picture rate.

max_bit_rate_calc_window[j] represents the size of a j-th time window used to calculate upper bounds for bitrate of representations of sub-layers by the unit of $1/100$ sec. A default value of max_bit_rate_calc_window[0] is 100.

max_bit_rate_calc_window[j] represents the size of a j-th time window used to calculate upper bounds for picture rate of representations of sub-layers by the unit of $1/100$ sec. A default value of max_pic_rate_calc_window[0] is 25600.

A case in which bit_rate_info_present_flag[i] is "1" represents that a description of the bit rate of the i-th sub-layer exists and a case in which bit_rate_info_present_flag[i] is "0" represents that the description of the bit rate of the i-th sub-layer does not exist. A default value of bit_rate_info_present_flag[i] is "1".

A case in which pic_rate_info_present_flag[i] is "1" represents that a description of the picture rate of the i-th sub-layer exists and a case in which pic_rate_info_present_flag[i] is "0" represents that the description of the picture rate of the i-th sub-layer does not exist. A default value of pic_rate_info_present_flag[i] is avg_bit_rate[i] represents average bit rate of a representation of the i-th sub-layer. avg_bit_rate[i] is similar as a content described in an SVC standard.

max_pic_rate[i][j] represents an upper bound of the bitrate of the representation of the i-th sub-layer as a value calculated as described in the SVC standard by using the time window represented by max_bit_rate_calc_window[j].

avg_pic_rate[i] represents average picture rate of the representation of the i-th sub-layer (a picture unit for 256 sec.). avg_pic_rate[i] is similar as a content described in the SVC standard.

max_pic_rate[i][j] represents an upper bound of the picture rate of the representation of the i-th sub-layer as a value calculated as described in the SVC standard by using the time window represented by max_pic_rate_calc_window[j].

2) Bucket Size for Max. Bitrate Definition

Another method of describing bit rate information may use a leaky bucket model. The leaky bucket model is a mode to calculate respective bit rate values by using an amount of fixed data instead of a fixed time interval. An embodiment in a case using such a mode is illustrated in Table 2 below.

TABLE 2

| | Descriptor |
|---|---|
| bit_rate_pic_rate_info( TempLevelLow, TempLevelHigh ) | |
| { | |
| num_max_bit_rate_values_minus1 | u(3) |
| for( j = 1; j <= num_max_bit_rate_values_minus1; j++ ) | |
| max_bit_rate_calc_bucket_size[ j ] | u(16) |
| num_max_pic_rate_windows_minus1 | u(3) |
| for( j = 1; j <= num_max_pic_rate_windows_minus1; j++ ) | |
| max_pic_rate_calc_window[ j ] | u(16) |
| for( i = TempLevelLow; i <= TempLevelHigh; i++ ) { | |
| bit_rate_info_present_flag[ i ] | u(1) |
| pic_rate_info_present_flag[ i ] | u(1) |
| if( bit_rate_info_present_flag[ i ] ) { | |
| avg_bit_rate[ i ] | u(16) |
| for( j = 0; j <= | |
| num_max_bit_rate_values_minus1; j++ ) | |
| max_bit_rate_[ i ][ j ] | u(16) |
| } | |
| if( pic_rate_info_present_flag[ i ] ) { | |
| constant_pic_rate_idc[ i ] | u(2) |
| avg_pic_rate[ i ] | u(16) |
| for( j = 0; j <= | |
| num_max_pic_rate_windows_minus1; j++ ) | |
| max_pic_rate [ i ][ j ] | u(16) |
| } | |
| } | |
| } | |

Meanings of syntaxes illustrated in FIG. 2 are described below.

num_max_bit_rate_values_minus1+1 means the number of max. bitrates clarified in a corresponding syntax structure.

max_pic_rate_calc_bucket_size[j] clarifies the size of a j-th leaky bucket used to calculate an upper bound of bit rate of the representations of the sub-layers by the unit of kilobits.

num_max_pic_rate_windows_minus1 has a value of 0 when bitrate information for the sub-layers is not defined.

max_pic_rate_calc_window[j] represents the size of a j-th time window used to calculate upper bounds for bitrate of representations of sub-layers by the unit of $1/100$ sec. A default value of max_pic_rate_calc_window[0] is 25600.

A case in which bit_rate_info_present_flag[i] is "1" represents that a description of the bit rate of the i-th sub-layer exists and a case in which bit_rate_info_present_flag[i] is "0" represents that the description of the bit rate of the i-th sub-layer does not exist. A default value of bit_rate_info_present_flag[i] is "1".

A case in which pic_rate_info_present_flag[i] is "1" represents that a description of the picture rate of the i-th sub-layer exists and a case in which pic_rate_info_present_flag[i] is "0" represents that the description of the picture rate of the i-th sub-layer does not exist. A default value of pic_rate_info_present_flag[i] is avg_bit_rate[i] represents average bit rate of a representation of the i-th sub-layer. avg_bit_rate[i] is similar as a content described in the SVC standard.

max_bit_rate[i][j] represents an upper bound of bit rate of the representation of the i-th sub-layer. max_pic_rate[i][j] represents an upper bound of the bitrate of the representation of the i-th sub-layer as a value calculated as described in the SVC standard by using the time window represented by max_pic_rate_calc_bucket_size[j]. The max bitrate may be calculated as below.

max_bit_rate[i][j]=max_bit_rate_calc_bucket_size[j]/
   SmallestInterval[i][j]

avg_pic_rate[i] represents average picture rate of the representation of the i-th sub-layer (a picture unit for 256 sec.). avg_pic_rate[i] is similar as a content described in the SVC standard.

max_pic_rate[i][j] represents an upper bound of the picture rate of the representation of the i-th sub-layer as a value calculated as described in the SVC standard by using the time window represented by max_pic_rate_calc_window[j].

The syntaxes illustrated in Tables 1 and 2 above may be added to extension of a video parameter set (hereinafter, VPS) and defined in a form of a supplemental enhancement information (SEI) message.

Table 3 illustrates an embodiment of a syntax in which bitrate information is defined as the form of the SEI message.

TABLE 3

|  | Descriptor |
|---|---|
| layer_characteristics_info( payloadSize ) { | |
|    for( i = 0; i <= vps_max_layers_minus1 ; i++ ) { | |
|       same_max_sub_layers_flag[ i ] | u(1) |
|       if( !same_max_sub_layers_flag [ i ]) | |
|          max_sub_layers_minus1[ i ] | u(3) |
|       bit_rate_pic_rate_info( 0, | |
|       (same_max_sub_layers_flag ? | |
|       max_sub_layers_minus1 | |
| : vps_max_sub_layers_minus1) ) | |
|    } | |
| } | |

In Table 3, same_max_sub_layers_flag[i] and max_sub_layers_minus1[i] may have the same meaning as a syntax having the same name to be described below.

same_max_sub_layers_flag[i] may be information representing whether the maximum number of i-th sub-layers is equal to the maximum number of i-th sub-layers defined in a VPS.

max_sub_layers_minus[i]+1 represents the number of sub-layers for i-th layer.

3) Bitrate and Picture Rate Information for Different Temporal Periods

Present bitrate and picture rate information is described only in the VPS. However, encoded video signals may have different bitrate and picture rate at different temporal periods. Therefore, the present invention proposes a technological scheme of the bitrate and the picture rate for the temporal period. Additional information proposed in Table 4 below may be used to represent a partial characteristic of a video content. Whereas, the bitrate and the picture rate in the VPS are valid only for a fully encoded sequence.

For such a purpose, Table 4 illustrates a syntax that describes bitrate and frame rate for different temporal periods by using a new SEI message (e.g., "period_characteristics").

TABLE 4

|  | Descriptor |
|---|---|
| period_characteristics( payloadSize ) { | |
|    duration_flag | u(1) |
|    if( duration_flag ) | |
|       period_duration | u(32) |
|    bit_rate_pic_rate_info( 0, | |
|    vps_max_sub_layers_minus1 ) | |
| } | |

"period_characteristics" which is the SEI message newly defined in Table 4 represents a characteristic of a temporal period of a video sequence, and the "period_characteristics" SEI message needs to be included in a first access unit (AU) in a decoding order of a period to which the corresponding SEI message is applied.

A meaning of the newly defined SEI message in Table 4 is described below.

A case in which duration_flag is "0" means that a length of a target temporal period is not described.

period_duration represents the length of the target temporal period by the unit of a clock tick of a 90-KHz clock.

Layer Referencing

At present, a layer referencing method described in the HEVC is configured to describe all layers which a specific layer directly refers to. However, it may be apparent that in a specific dimension (s), or layer, a specific layer (e.g., a quality layer "3") directly refers to a lower layer (e.g., a quality layer "2") without a delay.

For such a purpose, the present invention proposes a scheme that describes a dimension(s) having default direct dependency and describes layer dependency separately in a description loop of a scalable layer only for a dimension(s) that does not have the default indirect dependency.

Table 5 illustrates one example of a syntax in which a layer dependency scheme is described in VPS_extension according to the present invention.

TABLE 5

|  | Descriptor |
|---|---|
| vps_extension( ) { | |
|    while( !byte_aligned( ) ) | |
|       vps_extension_byte_alignment_reserved_one_bit | u(1) |
|    avc_base_codec_flag | u(1) |
|    scalability_mask | u(16) |
|    for( i = 0; i <NumScalabilityTypes; i++ ) { | |
|       dimension_id_len_minus1[ i ] | u(3) |
|       default_dependency_flag [ i ] | u(1) |
|    } | |
|    default_temp_dependency_flag | u(1) |
|    vps_nuh_layer_id_present_flag | u(1) |
|    // layer specific information | |
|    for( i = 1; i <= vps_max_layers_minus1; i++ ) { | |
|       // mapping of layer ID to scalability dimension IDs | |
|       if( vps_nuh_layer_id_present_flag ) | |

TABLE 5-continued

| | Descriptor |
|---|---|
|    layer_id_in_nuh[ i ] | u(6) |
|    for( j = 0; j <= num_dimensions_minus1; j++ )- | |
|      dimension_id[ i ][ j ] | u(v) |
|  } | |
|  for( i = 1; i <= vps_max_layers_minus1 ; i++ ) { | |
|    same_max_sub_layers_flag[ i ] | u(1) |
|    if( same_max_sub_layers_flag [ i ]) | |
|      profile_tier_level( 1, vps_max_sub_layers_minus1 ) | |
|    else { | |
|      max_sub_layers_minus1[ i ] | u(3) |
|      profile_tier_level( 1, max_sub_layers_minus1[ i ] ) | |
|    } | |
|  } | |
|  for( i = 1; i <= vps_max_layers_minus1; i++ ) { | |
|    // layer dependency | |
|    specific_dependency_flag [i] | u(1) |
|      if( specific_dependency_flag [i] = =1) { | |
|      num_direct_ref_layers[ i ] | u(6) |
|      for( j = 0; j < num_direct_ref_layers[ i ]; j++ ) { | |
|        ref_layer_id[ i ][ j ] | u(6) |
|        temporal_dim_description_flag[ i ][ j ] | u(1) |
|          if( temporal_dim_description_flag[ i ][ j ] = =1) { | |
|          num_unref_temp_layers[ i ][ j ] | u(3) |
|          for( k = 0; k < num_unref_temp_layers[ i ][ j ]; k++ ) { | |
|            unref_temp_layer_id[ i ][ j ][ k ] | u(6) |
|          } | |
|        } | |
|      } | |
|  } | |
|  priority_description_flag | |
|  if( priority_description_flag ) { | |
|    num_priority_policies_minus1 | u(8) |
|    for(i = 0; i < num_priority_policies_minus1; i++) | |
|      priority_policy_description( ) | |
|  } | |
| } | |

Syntax elements newly defined or modified in Table 5 have meanings described below.

A case in which default_dependency_flag[i] has "1" represents that a scalability dimension or a scalability layer) i has default dependency. This means that a layer in which dimension_id[i]=n with a dimension or layer directly refers to a layer dimension_id[i]=n−1. In the case of non-default dependencies, the reference layer may be signaled by specific_dependency_flag.

A case in which default_temp_dependency_flag has "1" represents that a temporal dimension has the default dependency.

A case in which specific_dependency_flag[i] has "1" represents that a reference (layer) relationship is to be described below. A case in which specific_dependency_flag[i] has "0" represents that the layer (dimension) I has the default dependency, has indirect dependency, or has no dependency layer.

num_direct_ref_layers[i] specifies the number of layers which an i-th layer directly refers to. The case represents that not specified layers have the default dependency, has indirect dependency, or has no dependency layer.

A case in which temporal_dim_description_flag[i][j] has "1" means that a detailed dependency relationship regarding a temporal sub layer of ref_layer_id[i][j] of the scalable layer.

num_unref_temp_layers[i][j] represents the number of temporal sub layers which are not used as the dependency layer for a scalable layer i.

unref_temp_layer_id[i][j][k] represents an id value of the temporal sub layer which is not used as the dependency layer for the scalable layer i.

Herein, that layer C directly refers to layer B means that a decoder needs to use (non-decoded or decoded) data of layer B in order to decode layer C. Moreover, when layer B directly uses data of layer A, layer C does not directly refer to layer A.

The method proposed as above is difficult to represent different dependency layer structures in respective temporal levels (that is, sub layers). Representing the dependency layer is required to achieve different dependency layer structures in the respective temporal levels.

Table 6 below illustrates one example of a syntax to describe the dependency layer to achieve different dependency layer structures in the temporal levels. Each scalable layer is identified by layer_id and temporal_id values.

TABLE 6

| | Descriptor |
|---|---|
| vps_extension( ) { | |
| ..... | |
|  for( i = 1; i <= vps_max_layers_minus1; i++ ) { | |
|    for( t = 0; t <=max_sub_layers_minus1; t++) { | |
|      // layer dependency | |
|      num_direct_ref_scal_layers[ i ][ t ] | u(9) |
|      for( j = 0; j < num_direct_ref_scal_layers[ | |
|      i ][ t ]; j++ ) { | |
|        ref_layer_id[ i ][ t ][ j ] | u(6) |
|        ref_temporal_id[ i ][ t ][ j ] | u(3) |
|      } | |
|    } | |
|  } | |
| } | |

Referring to Table 6, num_direct_ref_scal_layers[i][t] specifies the number of dependency layers that a present scalable layer (identified by layer_id=I and temporal_id=t) directly refers to. Layers not specified herein may have the default dependency or an indirect dependency layer.

ref_layer_id[i][t][j] and ref_temporal_id[i][t][j] represent scalable layers (layer_id=ref_layer_id[i][t][j] and temporal_id=ref_layer_id[i][t][j]) which a present layer directly refers to.

When all layers (having unique layer ids) specified in all operation points defined in VPS of HEVC Version 1 have a direct or indirect dependency relationship each other, a content described by direct_dependency_flag is included in the operation point, and as a result, signaling by direct_dependency_flag may be omitted and the omission of the signaling may be known to layer_dependency_info_flag.

Table 7 illustrates one example of a syntax to representing a method that signals whether there is an interlayer dependency relationship in VPS extension according to the present invention.

TABLE 7

|  | Descriptor |
|---|---|
| vps_extension( ) { |  |
| ..... |  |
| layer_dependency_info_flag | u(1) |
| if (layer_dependency_info_flag) |  |
| for( i = 1; i <= vps_max_layers_minus1; i++ ) |  |
| for( j = 0; j < i; j++ ) |  |
| direct_dependency_flag[ i ][ j ] | u(1) |

Referring to Table 7, a case in which layer_dependency_info_flag is 1 represents that layer dependency associated information is described in VPS extension and a case in which layer_dependency_info_flag is 0 represents that the layer dependency associated information is not described in the VPS extension.

Further, a specific scalability dimension may be added to the default type of the scalability dimension which is described at present. That is, as illustrated in Table 8, a priority ID that enables extracting and consuming contents according to the order of a priority selected in encoding or after encoding and a region ID that enables extracting and viewing only a specific region may be added to the default type of the scalability dimension.

TABLE 8

| scalability_mask | Scalability dimension |
|---|---|
| 0 | none (base HEVC) |
| 1 | spatial |
| 2 | quality |
| 3 | depth |
| 4 | multiview |
| 5 | priority ID |
| 6 | region ID |
| 7 . . . 15 | reserved |

Profile Tier Level (Representing Profile, Tier, and Level Information Regarding Layer)

At present, profile_tier_level (profile, tier, and level information) is configured to be signaled as many as the number (that is, vps_max_sub_layers_minus1+1) of maximum sub-layers (alternatively, temporal sub-layers) in a bitstream for respective layers (layers having layer_id values) in an extension part of the VPS. However, the respective layers may have different numbers of sub-layers and it may be preferable to describe the number of sub-layers in each layer for a middle box. Therefore, signaling of profile_tier_level may be modified like a part displayed by a shadow in a syntax of vps_extension( ) described in Table 5 above, and meanings of modified syntax elements are described as below.

Referring to Table 5, a case in which same_max_sub_layers_flag[i] is "1" represents that a max. sub-layer value of the temporal sub-layer of a layer i is vps_max_sub_layers_minus1+1.

max_sub_layers_minus1[i]+1 represents a max. sub-layer value of a maximum temporal sub-layer of the layer i.

same_max_sub_layers_flag[i] and max_sub_layers_minus1[i] may be signaled together with profile_tier_level as described in the embodiment of Table 5 above and signaled separately as described in the embodiment of Table 9 below.

TABLE 9

| vps_extension( ) { |  |
|---|---|
| ............... |  |
| for( IsIdx = 1 ; IsIdx <= vps_num_layer_sets_minus1; IsIdx ++ ) { |  |
| same_max_sub_layers_flag[IsIdx ] | u(1) |
| if( !same_max_sub_layers_flag [IsIdx ]) |  |
| max_sub_layers_minus1[IsIdx ] | u(3) |
| vps_profile_present_flag[ IsIdx ] | u(1) |
| if( !vps_profile_present_flag[ IsIdx ] ) |  |
| profile_layer_set_ref_minus1[ IsIdx ] | ue(v) |
| profile_tier_level( vps_profile_present_flag[ IsIdx ], vps_max_sub_layers_minus1[IsIdx]) |  |
| } |  |

As described in detail, the maximum number of sub-layers (the maximum number of temporal sub-layers) is signaled for each layer to assist a capability negotiation or an extractor.

Further, in a case in which layers have different frame rates, and in a case in which max_one_active_ref_layer_flag is 1, NumDirectRefLayers[nuh_layer_id] is 1, or all_ref_layers_active_flag is 1, the decoder may not distinguish two cases to be described below.

i) a case in which since an access unit (AU) is a picture which is not present in the bitstream (for example, due to the dependency layer having a different frame rate), the AU does not have a coded (encoded/decoded) picture for a dependency layer which a present layer directly refers to ii) a case in which the coded (encoded/decoded) picture for the dependency layer which the present layer directly refers to is lost while being transmitted The present invention proposes a method for distinguishing the aforementioned cases i) and ii). That is, in the present invention, it may be judged whether a lower-layer picture for a higher sub-layer AU is intentionally missed or lost in the decoder or the middle box by signaling the maximum number of sub-layers for each layer in the VPS.

In a method of describing the maximum value (number) of sub-layers for each enhancement layer (that is, a layer of layer_id>0), there is a scheme that signals the maximum value of sub-layers of a corresponding layer only for a layer having the maximum value of sub-layers other than vps_max_sub_layers_minus1+1 signaled in the video parameter set (VPS) as presented above or there may be schemes like an embodiment to be described below.

A. A scheme that signals the maximum value of sub-layers of the corresponding layer for each sequence parameter set (SPS) corresponding to each enhancement layer, that is, the layer of layer_id>0

Table 10 illustrates one example of a syntax representing a method of signaling the maximum value of sub-layers of the corresponding layer in the SPS.

TABLE 10

| seq_parameter_set_rbsp( ) { | |
| --- | --- |
| ............... | |
| sps_max_sub_layers_minus1 | u(3) |
| sps_temporal_id_nesting_flag | u(1) |
| ............... | |
| } | |

B. A scheme that signals the number of sub-layers of each enhancement, that is, the layer of layer_id>0 in the video parameter set (VPS) extension Table 11 illustrates one example of a syntax representing a method of signaling the maximum number of temporal sub-layers in the VPS extension.

TABLE 11

| vps_extension( ) { |   |
| --- | --- |
| ............... |   |
| for( i = 1; i <= vps_max_layers_minus1; i ++ ) |   |
| max_sub_layers_minus1[ i ] | u(3) |
| ............... |   |
| } |   |

Referring to Table 11, max_sub_layers_minus1[i]+1 represents the maximum value of sub-layers (the maximum number of temporal sub-layers) having an i-th layer.

C. A scheme that signals the maximum value of sub-layers in the SPS of the corresponding layer only when vps_max_sub_layers_minus1+1 signaled in the VPS and the maximum value of sub-layers of a specific layer are different from each other A general VPS syntax signals the maximum value of sub-layers in all bitstreams by using a value of vps_max_sub_layers_minus1 as illustrated in Table 12 below.

TABLE 12

|   | Descriptor |
| --- | --- |
| video_parameter_set_rbsp( ) { |   |
| vps_video_parameter_set_id | u(4) |
| vps_reserved_three_2bits | u(2) |
| vps_max_layers_minus1 | u(6) |
| vps_max_sub_layers_minus1 | u(3) |
| vps_temporal_id_nesting_flag | u(1) |
| ............... |   |
| } |   |

In this case, when a layer is present, which has a maximum sub-layer value which is not equal to a value of vps_max_sub_layers_minus1+1 signaled in the VPS, the maximum sub-layer value may be signaled in the SPS of the enhancement layer as illustrated in Table 13.

TABLE 13

|   | Descriptor |
| --- | --- |
| seq_parameter_set_rbsp( ) { |   |
| ............... |   |
| if (nuh_layer_id ==0){ |   |
| sps_max_sub_layers_minus1 | u(3) |
| sps_temporal_id_nesting_flag | u(1) |
| } else { |   |
| max_sub_layers_predict_flag | u(1) |
| if (!max_sub_layers_predict_flag) |   |
| sps_max_sub_layers_minus1 | u(3) |
| } |   |
| ............... |   |
| } |   |

Referring to Table 13, max_sub_layers_predict_flag is signaled when a value of nuh_layer_id is larger than 0 (that is, in the case of the enhancement layer). When a value of max_sub_layers_predict_flag is 1, sps_max_sub_layers_minus1 may be inferred as vps_max_sub_layers_minus1 and when the value of max_sub_layers_predict_flag is 0, sps_max_sub_layers_minus is explicitly signaled to the SPS.

When the maximum sub-layer value is signaled in the SPS corresponding to the corresponding layer for each layer, maximum DPB size and maximum latency time information signaled according to the maximum sub-layer value may be signaled in the SPS. Alternatively, when the maximum sub-layer value is signaled in the VPS extension for each layer, values of sps_max_dec_pic_buffering_minus1, sps_max_num_reorder_pics, and sps_max_latency_increase_plus1 which are the maximum DPB size and maximum latency time information signaled in the SPS may be signaled in not the SPS but the VPS extension, in order to remove parsing dependency between the VPS and the SPS.

A. In a scheme of signaling the maximum sub-layer value of the corresponding layer for each sequence parameter set (SPS) corresponding to each enhancement layer, (that is, a layer of layer_id>0), the maximum DPB size and maximum latency time information may be signaled in the SPS as illustrated in Table 14.

TABLE 14

| seq_parameter_set_rbsp( ) { |   |
| --- | --- |
| ............... |   |
| sps_max_sub_layers_minus1 | u(3) |
| sps_temporal_id_nesting_flag | u(1) |
| ............... |   |
| sps_sub_layer_ordering_info_present_flag | u(1) |
| for( i = ( sps_sub_layer_ordering_info_present_flag |   |
| ? 0 : sps_max_sub_layers_minus1 ); |   |
| i <= sps_max_sub_layers_minus1; i++ ) { |   |
| sps_max_dec_pic_buffering_minus1[ i ] | ue(v) |
| sps_max_num_reorder_pics[ i ] | ue(v) |
| sps_max_latency_increase_plus1[ i ] | ue(v) |
| } |   |
| ............... |   |
| } |   |

B. In a scheme of independently signaling the maximum sub-layer value of each enhancement layer, that is, the layer of layer_id>0 in the video parameter set (VPS) extension, the maximum DPB size and maximum latency time information may be signaled in the VPS extension as illustrated in Tables 15 and 16.

TABLE 15

| vps_extension( ) { |   |
| --- | --- |
| ............... |   |
| for( i = 1; i <= vps_max_layers_minus1; i ++ ) { |   |
| max_sub_layers_minus1[i] | u(3) |
| sub_layer_ordering_info_present_flag[i] | u(1) |
| for( j = ( sub_layer_ordering_info_present_flag[i] |   |
| ? 0 : max_sub_layers_minus1[i] ); |   |
| j <= max_sub_layers_minus1[i]; i++ ) { |   |
| max_dec_pic_buffering_minus1[ i ][ j ] | ue(v) |
| max_num_reorder_pics[ i ][ j ] | ue(v) |
| max_latency_increase_plus1[ i ][ j ] | ue(v) |
| } |   |
| } |   |
| ............... |   |
| } |   |

TABLE 16

```
vps_extension( ) {
    ...............
    for( i = 1; i <= vps_max_layers_minus1; i ++ )
        max_sub_layers_minus1[i]                               u(3)
    ...............
    for( i = 1; i <= vps_max_layers_minus1; i ++ ){
        sub_layer_ordering_info_present_flag[i]                u(1)
        for( j = ( sub_layer_ordering_info_present_flag[i]
            ? 0 : max_sub_layers_minus1[i] );
                j <= max_sub_layers_minus1[i]; i++ ) {
            max_dec_pic_buffering_minus1[ i ][ j ]             ue(v)
            max_num_reorder_pics[ i ][ j ]                     ue(v)
            max_latency_increase_plus1[ i ][ j ]               ue(v)
        }
    }
    ...............
}
```

C. In a scheme of signaling the maximum sub-layer value only when the maximum sub-layer value of each enhancement layer, that is, the layer of layer_id>0 in the video parameter set (VPS) extension is different from vps_max_sub_layers_minus1+1, the maximum DPB size and maximum latency time information may be signaled in the VPS extension as illustrated in subsequent Examples C-1 to C-4.

Examples C-1 and C2 describe a scheme of signaling the maximum DPB size and maximum latency time information of all layers in the VPS extension.

Examples C-3 and C4 describe a scheme of signaling the maximum DPB size and maximum latency time information of the corresponding layer in the VPS extension only when the maximum sub-layer value and the value of vps_max_sub_layers_minus1+1 are different from each other or the maximum sub-layer value and the value of vps_max_sub_layers_minus1+1 are equal to each other but the maximum DPB size and maximum latency time information of all bitstreams signaled in the VPS are not equal to each other.

Example C-1

TABLE 17

```
vps_extension( ) {
    ...............
    for( i = 1; i <= vps_max_layers_minus1; i ++ ) {
        same_max_sub_layers_flag[i ]                           u(1)
        if( !same_max_sub_layers_flag [i ])
            max_sub_layers_minus1[i ]                          u(3)
        sub_layer_ordering_info_present_flag[i]                u(1)
        for( j = ( sub_layer_ordering_info_present_flag[i]
            ? 0 : max_sub_layers_minus1[i] );
                j <= max_sub_layers_minus1[i]; i++ ) {
            max_dec_pic_buffering_minus1[ i ][ j ]             ue(v)
            max_num_reorder_pics[ i ][ j ]                     ue(v)
            max_latency_increase_plus1[ i ][ j ]               ue(v)
        }
        vps_profile_present_flag[ i ]                          u(1)
        if( !vps_profile_present_flag[ i ] )
```

TABLE 17-continued

```
            profile_layer_set_ref_minus1[ i]                   ue(v)
        profile_tier_level( vps_profile_present_flag[ i ],
            vps_max_sub_layers_minus1[i])
        ...............
    }
    ...............
}
```

Example C-2

TABLE 18

```
vps_extension( ) {
    ...............
    for( i = 1; i <= vps_max_layers_minus1; i ++ ) {
        same_max_sub_layers_flag[i ]                           u(1)
        if( !same_max_sub_layers_flag [i ])
            max_sub_layers_minus1[i ]                          u(3)
    }
    ...............
    for( i = 1; i <= vps_max_layers_minus1; i ++ ){
        sub_layer_ordering_info_present_flag[i]                u(1)
        for( j = ( sub_layer_ordering_info_present_flag[i]
            ? 0 : max_sub_layers_minus1[i] );
                j <= max_sub_layers_minus1[i]; i++ ) {
            max_dec_pic_buffering_minus1[ i ][ j ]             ue(v)
            max_num_reorder_pics[ i ][ j ]                     ue(v)
            max_latency_increase_plus1[ i ][ j ]               ue(v)
        }
    }
    ...............
}
```

Example C-3

Table 19 illustrates signaling the maximum DPB size and maximum latency time information in the VPS and Table 20 illustrates signaling the maximum DPB size and maximum latency time information in the VPS extension.

TABLE 19

```
video_parameter_set_rbsp( ) {
    ...............
    vps_max_layers_minus1                                      u(6)
    vps_max_sub_layers_minus1                                  u(3)
    ...............
    vps_sub_layer_ordering_info_present_flag                   u(1)
    for( i = ( vps_sub_layer_ordering_info_present_flag
        ? 0 : vps_max_sub_layers_minus1 );
            i <= vps_max_sub_layers_minus1; i++ ) {
        vps_max_dec_pic_buffering_minus1[ i ]                  ue(v)
        vps_max_num_reorder_pics[ i ]                          ue(v)
        vps_max_latency_increase_plus1[ i ]                    ue(v)
    }
    ...............
}
```

TABLE 20

| vps_extension( ) { | |
|---|---|
| ............ | |
| for( i = 1; i <= vps_max_layers_minus1; i ++ ) { | |
|   same_max_sub_layers_flag[i] | u(1) |
|   if( !same_max_sub_layers_flag [i ]) | |
|     max_sub_layers_minus1[i ] | u(3) |
|   else | |
|     sub_layer_vps_buf_ordering_info_predict_flag[i] | |
|       if (!same_max_sub_layers_flag[i] \|\| !sub_layer_vps_buf_ordering_info_predict_flag[i]){ | |
|     sub_layer_ordering_info_present_flag[i] | u(1) |
|     for( j = ( sub_layer_ordering_info_present_flag[i] ? 0 : max_sub_layers_minus1i] ); | |
|       j  <=  max_sub_layers_minus1[i]; i++ ) { | |
|       max_dec_pic_buffering_minus1[ i][ j ] | ue(v) |
|       max_num_reorder_pics[ i ][ j ] | ue(v) |
|       max_latency_increase_plus1[ i ][ j ] | ue(v) |
|     } | |
|   } | |
| ............ | |
| } | |

Referring to Table 20, sub_layer_vps_buf_ordering_info_predict_flag[i] represents whether maximum DPB size and maximum latency time information of the i-th layer are the same as the maximum DPB size and maximum latency time information of all of the bitstreams signaled in the VPS when the maximum sub-layer value of the i-th layer is equal to vps_max_sub_layers_minus1+1.

A case in which sub_layer_vps_buf_ordering_info_predict_flag[i] has "1" represents that the maximum DPB size and maximum latency time information of the i-th layer are the same as the maximum DPB size and maximum latency time information of all of the bitstreams signaled in the VPS and a case in which sub_layer_vps_buf_ordering_info_predict_flag[i] has "0" represents that the maximum DPB size and maximum latency time information of the i-th layer are not the same as the maximum DPB size and maximum latency time information of all of the bitstreams signaled in the VPS.

Maximum DPB size and maximum latency time information may be signaled only when sub_layer_vps_buf_ordering_info_predict_flag[i] has "0" or the maximum sub-layer value is not equal to vps_max_sub_layers_minus1+1. When sub_layer_vps_buf_ordering_info_predict_flag[i] is not signaled, the value of sub_layer_vps_buf_ordering_info_predict_flag[i] is set to "0".

Example C-3.1

Example C-3.1 differently expresses Example C-3 above and Table 21 illustrates signaling the maximum DPB size and maximum latency time information in the VPS and Table 22 illustrates signaling the maximum DPB size and maximum latency time information in the VPS extension.

TABLE 21

| video_parameter_set_rbsp( ) { | |
|---|---|
| ............ | |
| vps_max_layers_minus1 | u(6) |
| vps_max_sub_layers_minus1 | u(3) |
| ............ | |
| vps_sub_layer_ordering_info_present_flag | u(1) |
| for( i = ( vps_sub_layer_ordering_info_present_flag ? 0 : vps_max_sub_layers_minus1 ); | |
|   i  <=  vps_max_sub_layers_minus1; i++ ) { | |
|   vps_max_dec_pic_buffering_minus1[ i ] | ue(v) |
|   vps_max_num_reorder_pics[ i ] | ue(v) |

TABLE 21-continued

| video_parameter_set_rbsp( ) { | |
|---|---|
|   vps_max_latency_increase_plus1[ i ] | ue(v) |
| } | |
| ............ | |
| } | |

TABLE 22

| vps_extension( ) { | |
|---|---|
| ............ | |
| for( i = 1; i <= vps_max_layers_minus1; i ++ ) { | |
|   same_max_sub_layers_flag[i] | u(1) |
|   if( !same_max_sub_layers_flag [i ]) | |
|     max_sub_layers_minus1[i ] | u(3) |
|   else | |
|     sub_layer_vps_buf_ordering_info_predict_flag[i] | |
|     if | |
|     (!sub_layer_vps_buf_ordering_info_predict_flag[i]){ | |
|     sub_layer_ordering_info_present_flag[i] | u(1) |
|     for( j = ( sub_layer_ordering_info_present_flag[i] ? 0 : | |
|       max_sub_layers_minus1i] ); | |
|       j  <=  max_sub_layers_minus1[i]; i++ ) { | |
|       max_dec_pic_buffering_minus1[ i][ j ] | ue(v) |
|       max_num_reorder_pics[ i ][ j ] | ue(v) |
|       max_latency_increase_plus1[ i ][ j ] | ue(v) |
|     } | |
|   } | |
| ............ | |
| } | |

Meanings of syntaxes added in Table 22 are the same as those of the syntaxes having the same names. For example, sub_layer_vps_buf_ordering_info_predict_flag[i] is described with reference to Table 20.

Example C-4

TABLE 23

| vps_extension( ) { | |
|---|---|
| ............ | |
| for( i = 1; i <= vps_max_layers_minus1; i ++ ) { | |
|   same_max_sub_layers_flag[i] | u(1) |
|   if( !same_max_sub_layers_flag [i ]) | |
|     max_sub_layers_minus1[i ] | u(3) |
| } | |

TABLE 23-continued

```
vps_extension( ) {
    ...............
    for( i = 1; i <= vps_max_layers_minus1; i ++ ){
        if (same_max_sub_layers_flag[i])
            sub_layer_vps_buf_ordering_info_predict_flag[i]        u(1)
            if (!same_max_sub_layers_flag[i] ||
                !sub_layer_vps_buf_ordering_info_predict_flag[i]){
        sub_layer_ordering_info_present_flag[i]                    u(1)
        for( j = ( sub_layer_ordering_info_present_flag[i] ? 0 :
            max_sub_layers_minus1[i] );
            j  <=  max_sub_layers_minus1[i]; i++ ) {
            max_dec_pic_buffering_minus1[ i ][ j ]                 ue(v)
            max_num_reorder_pics[ i ][ j ]                         ue(v)
            max_latency_increase_plus1[ i ][ j ]                   ue(v)
        }
                }
        }
    ...............
}
```

Referring to Table 23, sub_layer_vps_buf_ordering_info_predict_flag[i] represents whether maximum DPB size and maximum latency time information of the i-th layer are the same as the maximum DPB size and maximum latency time information of all of the bitstreams signaled in the VPS when the maximum sub-layer value of the i-th layer is equal to vps_max_sub_layers_minus1+1.

A case in which sub_layer_vps_buf_ordering_info_predict_flag[i] has "1" represents that the maximum DPB size and maximum latency time information of the i-th layer are the same as the maximum DPB size and maximum latency time information of all of the bitstreams signaled in the VPS and a case in which sub_layer_vps_buf_ordering_info_predict_flag[i] has "0" represents that the maximum DPB size and maximum latency time information of the i-th layer are not the same as the maximum DPB size and maximum latency time information of all of the bitstreams signaled in the VPS.

Maximum DPB size and maximum latency time information of the corresponding layer may be signaled only when sub_layer_vps_buf_ordering_info_predict_flag[i] has "0" or the maximum sub-layer value is not equal to vps_max_sub_layers_minus1+1. When sub_layer_vps_buf_ordering_info_predict_flag[i] is not signaled, the value of sub_layer_vps_buf_ordering_info_predict_flag[i] is set to "0".

Example C-4.1

Example C-4.1 differently expresses Example C-4 above.

TABLE 24

```
vps_extension( ) {
    ...............
    for( i = 1; i <= vps_max_jayers_minus1; i ++ ) {
        same_max_sub_layers_flag[i ]                               u(1)
        if( !same_max_sub_layers_flag [i ])
            max_sub_layers_minus1[i ]                              u(3)
    }
    ...............
    for( i = 1; i <= vps_max_layers_minus1; i ++ ){
        if (same_max_sub_layers_flag[i])
            sub_layer_vps_buf_ordering_info_predict_flag[i]        u(1)
            if
            (!sub_layer_vps_buf_ordering_info_predict_flag[i]){
            sub_layer_ordering_info_present_flag[i]                u(1)
            for( j = ( sub_layer_ordering_info_present_flag[i] ? 0 :
                max_sub_layers_minus1[i] );
```

TABLE 24-continued

```
vps_extension( ) {
            j  <=  max_sub_layers_minus1[i]; i++ ) {
            max_dec_pic_buffering_minus1[ i ][ j ]                 ue(v)
            max_num_reorder_pics[ i ][ j ]                         ue(v)
            max_latency_increase_plus1[ i ][ j ]                   ue(v)
        }
            }
    }
    ...............
}
```

Meanings of syntaxes added in Table 24 are the same as those of the syntaxes having the same names. For example, sub_layer_vps_buf_ordering_info_predict_flag[i] is described with reference to Table 23.

D. In a scheme of signaling the maximum number of sub-layers in the SPS of the corresponding layer only when vps_max_sub_layers_minus1+1 signaled in the VPS and a maximum sub-layer value of a specific layer are different from each other, maximum DPB size and maximum latency time information may be signaled in the SPS or the VPS extension as described in Examples D-1 to D-3 below.

A general VPS syntax signals the maximum value of sub-layers in all bitstreams by using a value of vps_max_sub_layers_minus1 as illustrated in Table 25 below.

TABLE 25

| video_parameter_set_rbsp( ) { | Descriptor |
|---|---|
| vps_video_parameter_set_id | u(4) |
| vps_reserved_three_2bits | u(2) |
| vps_max_layers_minus1 | u(6) |
| vps_max_sub_layers_minus1 | u(3) |
| vps_temporal_id_nesting_flag | u(1) |
| ............... | |
| vps_extension_flag | (1) |
| if( vps_extension_flag ) { | |
| vps_extension( ) | |
| vps_extension2_flag | u(1) |
| if( vps_extension2_flag ) | |
| while( more_rbsp_data( ) ) | |
| vps_extension_data_flag | u(1) |
| } | |
| rbsp_trailing_bits( ) | |
| } | |

In this case, in a case where the maximum sub-layer value is signaled when the maximum sub-layer value of the corresponding layer and vps_max_sub_layers_minus1+1 are not equal to each other in the SPS of the enhancement layer, an example in which the maximum DPB size and maximum latency time information of the corresponding layer is signaled in the SPS will be described in Table 26 below.

Example D-1

TABLE 26

| seq_parameter_set_rbsp( ) { | Descriptor |
|---|---|
| ............... | |
|   if (nuh_layer_id ==0){ | |
|     sps_max_sub_layers_minus1 | u(3) |
|     sps_temporal_id_nesting_flag | u(1) |
|   } else { | |
|     max_sub_layers_predict_flag | u(1) |
|     if (!max_sub_layers_predict_flag) | |
|       sps_max_sub_layers_minus1 | u(3) |
|   } | |
| ............... | |
|   if (nuh_layer_id ==0 \|\| (nuh_layer_id >0 && !max_sub_layers_predict_flag)){ | |
|     sps_sub_layer_ordering_info_present_flag | u(1) |
|     for( i = ( sps_sub_layer_ordering_info_present_flag ? 0 : sps_max_sub_layers_minus1 ); | |
|       i <= sps_max_sub_layers_minus1; i++ ) { | |
|       sps_max_dec_pic_buffering_minus1[ i ] | ue(v) |
|       sps_max_num_reorder_pics[ i ] | ue(v) |
|       sps_max_latency_increase_plus1[ i ] | ue(v) |
|     } | |
|   } | |
| ............... | |
| } | |

Two examples below are examples in which maximum DPB size and maximum latency time information of a layer having a maximum sub-layer value equal to vps_max_sub_layers_minus1+1 among enhancement layers are signaled.

Example D-2 is an example in which maximum DPB size and maximum latency time information of all layers having the maximum sub-layer value equal to vps_max_sub_layers_minus1+1 are signaled.

Example D-3 describes a scheme of signaling maximum DPB size and maximum latency time information of the corresponding layer in the VPS extension only when maximum DPB size and maximum latency time information in entire bitstreams are the same as the maximum DPB size and maximum latency time information of the layer having the maximum sub-layer value equal to vps_max_sub_layers_minus1+1 signaled in the VPS.

Example D-2

TABLE 27

| vps_extension( ) { | Descriptor |
|---|---|
| ............... | |
| for( i = 1; i <= vps_max_layers_minus1; i++ ){ | |
|   max_sub_layers_vps_predict_flag[i] | |
|   if (max_sub_layers_vps_preidct_flag[i]){ | |
|     sub_layer_ordering_info_present_flag[i] | u(1) |
|     for( j = ( sub_layer_ordering_info_present_flag[i] ? 0 : vps_max_sub_layers_minus1); | |
|       j <= vps_max_sub_layers_minus1; i++ ) { | |
|       max_dec_pic_buffering_minus1[ i ][ j ] | ue(v) |
|       max_num_reorder_pics[ i ][ j ] | ue(v) |
|       max_latency_increase_plus1[ i ][ j ] | ue(v) |
|     } | |
|   } | |
| } | |
| ............... | |
| } | |

Referring to Table 27, a case in which max_sub_layers_vps_predict_flag[i] has "1" represents that the maximum (temporal) sub-layer value of the i-th layer is vps_max_sub_layers_minus1+1 and a case in which max_sub_layers_vps_predict_flag[i] has "0" represents that the maximum (temporal) sub-layer value of the i-th layer has a value of sps_max_sub_layers_minus1+1 signaled in the SPS (a SPS having the same nuh_layer_id value as the corresponding layer) of the corresponding layer.

Maximum DPB size and latency time associated information of a layer having a maximum (temporal) sub-layer value equal to vps_max_sub_layers_minus1+1 is signaled in vps_extension and in a layer having a maximum (temporal) sub-layer value different from vps_max_sub_layers_minus1+1 is signaled as described in Example D-1.

Example D-3

TABLE 28

| vps_extension( ) { | Descriptor |
|---|---|
| ............... | |
| for( i = 1; i <= vps_max_layers_minus1; i++ ){ | |
|   max_sub_layers_vps_predict_flag[i] | |
|   if (max_sub_layers_vps_preidct_flag[i]){ | |
|     sub_layer_vps_buf_ordering_info_predict_flag[i] | u(1) |
|     if | |
|     (!sub_layer_vps_buf_ordering_info_predict_flag[i]){ | |
|     sub_layer_ordering_info_present_flag[i] | u(1) |
|     for( j = ( sub_layer_ordering_info_present_flag[i] ? 0 : vps_max_sub_layers_minus1); | |
|       j <= vps_max_sub_layers_minus1; i++ ) { | |
|       max_dec_pic_buffering_minus1[ i ][ j ] | ue(v) |
|       max_num_reorder_pics[ i ][ j ] | ue(v) |
|       max_latency_increase_plus1[ i ][ j ] | ue(v) |
|     } | |
|   } | |
| } | |
| ............... | |
| } | |

Referring to Table 28, a case in which max_sub_layers_vps_predict_flag[i] has "1" represents that the maximum (temporal) sub-layer value of the i-th layer is vps_max_sub_layers_minus1+1 and a case in which max_sub_layers_vps_predict_flag[i] has "0" represents that the maximum (temporal) sub-layer value of the i-th layer has a value of sps_max_sub_layers_minus1+1 signaled in the SPS (a SPS having the same nuh_layer_id value as the corresponding layer) of the corresponding layer.

sub_layer_vps_buf_ordering_info_predict_flag represents whether maximum DPB size and maximum latency time information of the i-th layer are the same as the maximum DPB size and maximum latency time information of all of the bitstreams signaled in the VPS when the maximum sub-layer value is equal to vps_max_sub_layers_minus1+1.

A case in which sub_layer_vps_buf_ordering_info_predict_flag[i] has "1" represents that the maximum DPB size and maximum latency time information of the i-th layer are the same as the maximum DPB size and maximum latency time information of all of the bitstreams signaled in the VPS and a case in which sub_layer_vps_buf_ordering_info_predict_flag[i] has "0" represents that the maximum DPB size and maximum latency time information of the i-th layer are not the same as the maximum DPB size and maximum latency time information of all of the bitstreams signaled in the VPS. Only in a case in which sub_layer_vps_buf_ordering_info_predict_flag[i] has "0", the maximum DPB size and maximum latency time information of the corresponding is signaled.

In all of the cases, max_dec_pic_buffering_minus1[0][j], max_num_reorder_pics[0][j], and max_latency_increase_plus1[0][j] use values of sps_max_dec_pic_buffering_minus1[j], max_num_reorder_pics[j], and max_latency_increase_plus1[j] signaled in an SPS of a base layer having nuh_layer_id=0.

A DPB may be managed for each layer by using the aforementioned signaled DPB associated syntax information.

(1) In the case of a layer in which a decoded picture of a specific layer is output by a decoder and displayed (that is, a layer in which layer_output_flag signaled in the VPS extension is '1'), a maximum DPB size for the corresponding layer may be determined.

MaxDPBsize[i][j] represents a maximum DPB size when the i-th layer decodes up to a temporal sub-layer in which temporal_id is j.

In a case in which a maximum (temporal) sub-layer value in all bitstreams to be decoded or a maximum (temporal) sub-layer value of a layer output to a display in the decoder is HighestTid, the maximum (temporal) sub-layer value of the i-th layer (in this case, i may be in the range of $1<=i<=vps\_max\_layers\_minus1$) is A and in a case in which A<HighestTid, a value of max_dec_pic_buffering_minus1[i][j] of the corresponding layer may adopt a value of max_dec_pic_buffering_minus1[i][A] for $A<j<=HighestTid$. Similarly, max_num_reorder_pics[i][j] and max_latency_incresase_plus1[i][j] may adopt values of max_num_reorder_pics[i][A] and max_latency_increase_plus1[i][A] for $A<j<=HighestTid$.

Further, in a case in which an i-th layer (in this case, i may be in the range of $1<=i<=vps\_max\_layers\_minus1$) having a specific temporal sub-layer is used as a dependency layer of another layer (in a syntax table below, max_tid_il_ref_pics_plus1[i] represents that an i-th layer in which a value of temporal_id representing a temporal sub-layer is equal to or smaller than a value of max_tid_il_ref_pics_plus1[i]-1 is used as a dependency layer of another layer), a value of MaxDPBsize[i][j] may adopt a value of max_dec_pic_buffering_minus1[i][max_tid_il_ref_pics_plus1[i]-1]+1 for j that belongs to a range of max_tid_il_ref_pics_plus1[i]-1<j<=HighestTid. A value of MaxDPBsize[i][j] in the case of $0<=j<=max\_tid\_il\_ref\_pics\_plus1[i]-1$ may adopt a value of max_dec_pic_buffering_minus1[i][j]+1.

Similarly, MaxReorderPics[i][j] and MaxLatencyIncreasePlus1[i][j] may also adopt values of max_num_reorder_pics[i][max_tid_il_ref_pics_plus1[i]-1] and max_latency_increase_plus1[i][max_tid_il_ref_pics_plus1[i]-1], for j that belongs to a range of max_tid_il_ref_pics_plus1-1[i] <j<=HighestTid and adopt values of max_num_reorder_pics[i][j] and max_latency_increase_plus1[i][j] in the case of, $0<=j<=max\_tid\_il\_ref\_pics\_plus1[i]-1$. Alternatively, MaxReorderPics[i][j] and MaxLatencyIncreasePlus1[i][j] in the case of $0<=j<=HighestTid$ may also adopt values of max_num_reorder_pics and max_latency_increase_plus1[j][j].

Table 29 illustrates one example of the VPS extension for managing the DPB for each layer by using the aforementioned syntax information.

TABLE 29

| vps_extension( ) { | Descriptor |
|---|---|
| ... | |
|   for( i = 1; i <= vps_max_layers_minus1; i++ ) | |
|     for( j = 0; j < i; j++ ) | |
|       direct_dependency_flag[ i ][ j ] | u(1) |
|   for( i = 0; i< vps_max_layers_minus1; i++ ) | |
|     max_tid_il_ref_pics_plus1[ i ] | u(3) |
| ... | |
| } | |

(2) In the case of a layer in which a decoded picture of a specific layer is not output by the decoder and displayed (that is, a layer in which layer_output_flag signaled in the VPS extension is '0'), a maximum DPB size for the corresponding layer may be determined.

In a case in which a maximum (temporal) sub-layer value in all bitstreams to be decoded or a maximum (temporal) sub-layer value of a layer output to a display in the decoder is HighestTid, the maximum (temporal) sub-layer value of the i-th layer (in this case, i may be in the range of $1<=i<=vps\_max\_layers\_minus1$) is A and in a case in which A<HighestTid, a value of max_dec_pic_buffering_minus1[i][j] of the corresponding layer may adopt a value of max_dec_pic_buffering_minus1[i][A] for $A<j<=HighestTid$. Similarly, max_num_reorder_pics[i][j] and max_latency_incresase_plus1[i][j] may adopt values of max_num_reorder_pics[i][A] and max_latency_increase_plus1[i][A] for $A<j<=HighestTid$.

A value of MaxDPBsize[i][j] in the case of $0<=j<=HighestTid$ may adopt a value of max_dec_pic_buffering_minus1[i][j]+1. MaxReorderPics[i][j] and MaxLatencyIncreasePlus1[i][j] in the case of $0<=j<=HighestTid$ may also adopt values of max_num_reorder_pics[i][j] and max_latency_increase_plus1[i][j].

(3) Similarly as described above, but the maximum DPB size may also be managed as below.

MaxDecPicbuffering[i][j][k] represents a maximum DPB size when a value of nuh_layer_id included in an i-th output layer set is j and a decoded maximum temporal_id value is k.

The maximum DPB size may be decided as described in Table 30 by using MaxDecPicbuffering[i][j][k].

TABLE 30

```
for(i=0; i<numOutputLayerSets; i++) {
    IsIdx = output_layer_set_idx_minus1[i] + 1;
    for (j=0; j<NumLayerInIdList[IsIdx]; j++) {
        LayerId = LayerIdxInVps[LayerSetLayerIdList[IsIdx][j]];
        if (output_layer_flag[IsIdx][j]) {
            for(k=0; k<max_sub_layers_vps_minus1[LayerId]; k++)
                MaxDexPicBuffering[i][LayerSetLayerIdList[IsIdx][j]][k]
                    = max_dec_pic_buffering_minus1[LayerId][k]+1;
        }else {
            for(k=0; k<max_sub_layers_vps_minus1[LayerId]; k++)
                if(k < max_tid_il_ref_pics_plus1[LayerId])
                    MaxDexPicBuffering[i][LayerSetLayerIdList[IsIdx][j]][k]
                        = max_dec_pic_buffering_minus1[LayerId][k]+1;
                else
                    MaxDexPicBuffering[i][LayerSetLayerIdList[IsIdx][j]][k]
                        =max_dec_pic_buffering_minus1[LayerId][max_tid_il_ref_pics_plus1[LayerId]-1]+1;
        }
}
```

Referring to Table 30, numOutputLayerSets represents the number of output layer sets which the bitstream may support.

output_layer_set_jdx_minus1[i]+1 represents an index value indicating a layer set corresponding to an i-th output layer set.

The layer set represents a set of layers included in a bitstream generated through a sub-bitstream extraction process.

LayerSetLayerIdList[IsIdx][j] represents nuh_layer_id of a j-th layer included in an i-th layer set.

LayerIdxInVps[layer_id_in_nuh][i] may be equal to i for 0<=i<=vps_max_layers_minus1. In this case, layer_id_in_nuh[i] represents a value of nuh_layer_id signaled in a VCL NAL unit of an i-th layer.

max_sub_layers_vps_minus1[m] represents a value of temporal_id, that is a maximum temporal sub-layer of an m-th layer, −1.

max_tid_il_ref_pics_plus1[m] represents that a picture of m-th layer is used as the dependency picture only when the value of temporal_id is equal to or smaller than a value of max_tid_il_ref_pics_plus1[i]−1 among m layers when an m-th layer is used as a dependency layer of an upper layer.

Alternatively, the syntaxes may be signaled as described in Tables 31 and 32 in order to manage parameters as described above.

TABLE 31

| vps_extension( ) { | Descriptor |
|---|---|
| ... | |
| for( i = 1; i < NumOutputLayerSets ; i++ ) | |
|   for( k = 0 ; k < NumLayersInIdList[ output_layer_set_idx_minus1[ i ] + 1] − 1; k++ ) { | |
|     sub_layer_vps_dpb_info_present_flag[ i ][ k ] | u(1) |
|     for( j = ( sub_layer_vps_dpb_info_present_flag[ i ][ k ] ? 0 : | |
|       vps_max_sub_layers_minus1; j <= vps_max_sub_layers_minus1; j++ ) { | |
|       max_vps_dec_pic_buffering_minus1[ i ][ k ][ j ] | ue(v) |
|     } | |
|   } | |
|   for( k = 0 ; k < vps_max_layers_minus1; k++ ) { | |
|     sub_layer_vps_ordering_info_present_flag[ k ] | u(1) |
|     for( j = ( sub_layer_vps_ordering_info_present_flag[ k ] ? 0: | |
|       vps_max_sub_layers_minus1; j <= vps_max_sub_layers_minus1; j++ ) { | |
|       max_vps_num_reorder_pics[ k ][ j ] | ue(v) |
|       max_vps_latency_increase_plus1[ k ][ j ] | ue(v) |
|     } | |
|   } | |
| ... | |
| } | |

TABLE 32

| vps_extension( ) { | Descriptor |
|---|---|
| ... | |
|   for( i = 1; i < NumOutputLayerSets ; i++ ) | |
|     for( k = 0 ; k < NumLayersInIdList[ output_layer_set_idx_minus1[ i ] + 1 ] - 1; k++ ) { | |
|       sub_layer_vps_dpb_info_present_flag[ i ][ k ] | u(1) |
|       for( j = ( sub_layer_vps_dpb_info_present_flag[ i ][ k ] ? 0 : | |
|         max_sub_layers_minus1[LayerIdxInVps[LayerSetLayerIdList[IsIdx][j]]];; j <= max_sub_layers_minus1[LayerIdxInVps[LayerSetLayerIdList[IsIdx][j]]]; j++ ) { | |
|         max_vps_dec_pic_buffering_minus1[ i ][ k ][ j ] | ue(v) |
|       } | |
|     } | |
|   for( k = 0 ; k < vps_max_layers_minus1; k++ ) { | |
|     sub_layer_vps_ordering_info_present_flag[ k ] | u(1) |
|     for( j = ( sub_layer_vps_ordering_info_present_flag[ k ] ? 0 : max_sub_layers_minus1[k]; j <= max_sub_layers_minus1[k]; j++ ) { | |
|       max_vps_num_reorder_pics[ k ][ j ] | ue(v) |
|       max_vps_latency_increase_plus1[ k ][ j ] | ue(v) |
|     } | |
|   } | |
| ... | |
| } | |

Representation of Priority Information

A method for representing a priority of a scalable layer of each bitstream is proposed. As described above, the priority may be described by a VPS or an SEI message (by, for example, layer_priority_info_message as described below) and as one example, a priority for a layer may be signaled as described in Tables 33 and 34 below.

TABLE 33

| layer_priority_info( payloadSize ) { | Descriptor |
|---|---|
|   duration_flag | u(1) |
|   if( duration_flag ) | |
|     period_duration | u(32) |
|   num_priority_policies_minus1 | u(8) |
|   for(i = 0; i <num_priority_policies_minus1; i++) | |
|     priority_policy_description( ) | |
| } | |

TABLE 34

| priority_policy_description( ) { | Descriptor |
|---|---|
| // mapping of scalable layer to priority IDs | |
| for( i = 0; i <= vps_max_layers_minus1; i++ ) | |
|   for( j = 0; j <= vps_max_sub_layers_minus1; j++ ) | |
|     priority_id[ i ] [ j ] | u(9) |
| //Priority Id Setting Uri | |
| PriorityIdSettingUriIdx = 0 | |
| do | |
|   priority_id_setting_uri[ PriorityIdSettingUriIdx ] | |
| while( priority_id_setting_uri[ PriorityIdSettingUriIdx++ ] != 0 ) | |
| } | |

Syntax elements newly defined or modified in Tables 33 and 34 have meanings described below.
    a case in which priority_description_flag is "1" represents priority information of the scalable layer is provided.
    num_priority_policies_minus1+1 represents the number of priority setting policies.
    priority_id[i][j] represents a priority value of a layer in which layer_id is i and temporal_id is j. priority_id[i][j] represents that a value of the element is smaller, the priority is higher.
    priority_id_setting_uri[PriorityIdSettingUriIdx] represents a universal resource identifier (URI) describing a method used to calculate a priority_id value in a NAL unit header for a target access unit set.

When a layer_priority_info message is present, the message needs to be included in a first access unit in terms of a decoding order of a cycle to which the message is applied.

Figure 4:
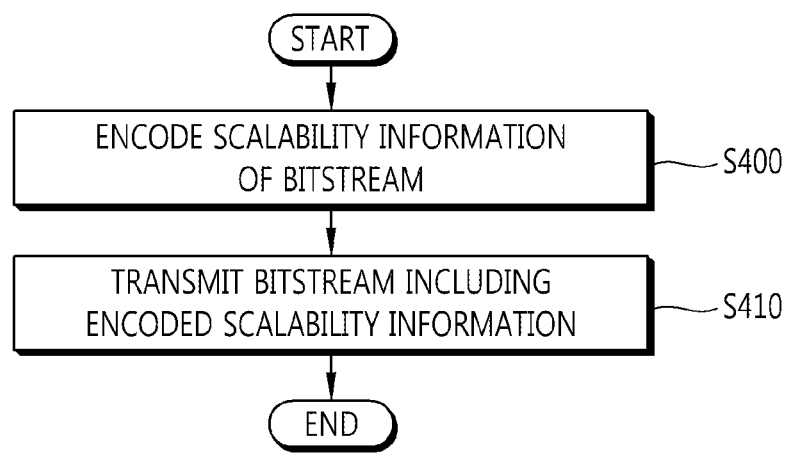
FIG. 4 is a flowchart schematically illustrating a method for picture encoding, which supports a scalable bitstream (hierarchical bitstream) according to an embodiment of the present invention.

FIG. 4 is a flowchart schematically illustrating a method for picture encoding, which supports a scalable bitstream (hierarchical bitstream) according to an embodiment of the present invention. The method of FIG. 4 may be performed by the picture encoding apparatus of FIG. 1.

Referring to FIG. 4, the encoding apparatus encodes scalability information of a bitstream (S400).

The scalability information of the bitstream represents information required to efficiently code (encode/decode) a scalable characteristic of the bitstream in a video coding structure that supports a scalable bitstream (scalable layer).

For example, as described above, the scalability information of the bitstream may include characteristic information of the bitstream, layer dependency information on layers included in the bitstream, profile, tier, and level information on the layers included in the bitstream and priority information on the layers included in the bitstream.

The characteristic information of the bitstream may include information on bit rate or picture rate calculated by using a fixed time interval (e.g., a time window) or a fixed data amount (e.g., a bucket size) and information on bit rate or picture rate calculated by using a different time interval.

The layer dependency information may include dependency relationship information (layer dependency information depending on whether to have a default dependency relationship) on each layer included in the bitstream and dependency relationship information on a temporal sub-layer.

The profile, tier, and level information represents information such as a profile, a tier, and a level for each layer included in the bitstream and may be signaled as many as the maximum number of sub-layers of each layer.

The priority information may include priority information for each layer for applying a priority policy to the layers included in the bitstream. The priority information may include, for example, priority ID information to extract and consume contents according to the priority or region ID information to extract and view a specific region.

Further, the scalability information of the bitstream may include sub-layer information on the layers included in the bitstream. That is, the scalability information may include information on the maximum number of sub-layers which each layer may have. Further, the scalability information may include maximum DPB size and maximum latency time information on each layer or each sub-layer.

The encoding apparatus may describe the scalability information of the bitstream through syntaxes including the VPS, the VPS extension, the SPS, the SEI message, and the like and encode the described syntax information.

Herein, a method of describing the scalability information through the syntaxes including the VPS, the VPS extension, the SPS, the SEI message, and the like has been described in detail with reference to Tables 1 to 34, and as a result, a description thereof will be omitted in the embodiment.

The encoding apparatus transmits a bitstream including encoded scalability information (S410).

Figure 5:
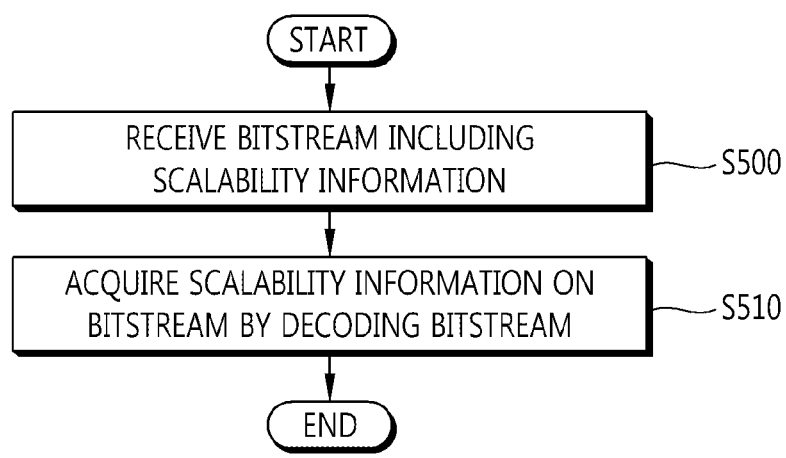
FIG. 5 is a flowchart schematically illustrating a method for picture decoding, which supports a scalable bitstream (hierarchical bitstream) according to an embodiment of the present invention.

FIG. 5 is a flowchart schematically illustrating a method for picture decoding, which supports a scalable bitstream (hierarchical bitstream) according to an embodiment of the present invention. The method of FIG. 5 may be performed by a picture decoding apparatus of FIG. 2.

Referring to FIG. 5, the decoding apparatus receives a bitstream including scalability information (S500).

The decoding apparatus decodes the received bitstream to acquire the scalability information on the bitstream (S510).

In this case, a process of acquiring the scalability information on the bitstream by decoding the bitstream may be regarded as an entropy decoding or parsing process and syntax element values of the scalability information may be output through the process.

The scalability information of the bitstream may include characteristic information of the bitstream, layer dependency information on layers included in the bitstream, profile, tier, and level information on the layers included in the bitstream and priority information on the layers included in the bitstream, as described above.

The characteristic information of the bitstream may include information on bit rate or picture rate calculated by using a fixed time interval (e.g., a time window) or a fixed data amount (e.g., a bucket size) and information on bit rate or picture rate calculated by using a different time interval.

The layer dependency information may include dependency relationship information (layer dependency information depending on whether to have a default dependency relationship) on each layer included in the bitstream and dependency relationship information on a temporal sub-layer.

The profile, tier, and level information represents information such as a profile, a tier, and a level for each layer included in the bitstream and may be signaled as many as the maximum number of sub-layers of each layer.

The priority information may include priority information for each layer for applying a priority policy to the layers included in the bitstream. The priority information may include, for example, priority ID information to extract and consume contents according to the priority or region ID information to extract and view a specific region.

Further, the scalability information of the bitstream may include sub-layer information on the layers included in the bitstream. That is, the scalability information may include information on the maximum number of sub-layers which each layer may have. Further, the scalability information may include maximum DPB size and maximum latency time information on each layer or each sub-layer.

Meanwhile, the encoding apparatus may describe the scalability information of the bitstream through syntaxes including the VPS, the VPS extension, the SPS, the SEI message, and the like and encode and signal the described syntax information as described above in detail.

Therefore, the decoding apparatus may acquire the scalability information on the bitstream by decoding the syntax elements including the VPS, the VPS extension, the SPS, the SEI message, and the like.

Herein, a method of describing the scalability information through the syntaxes including the VPS, the VPS extension, the SPS, the SEI message, and the like has been described in detail with reference to Tables 1 to 34, and as a result, a description thereof will be omitted in the embodiment.

Figure 6:
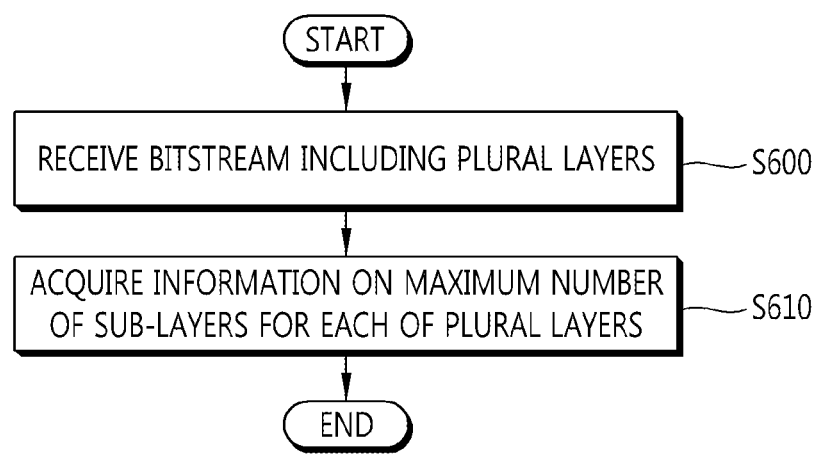
FIG. 6 is a flowchart schematically illustrating a method for signal sub-layer information for a scalable layer in a picture encoding/decoding structure, which supports a scalable bitstream (hierarchical bitstream) according to an embodiment of the present invention.

FIG. 6 is a flowchart schematically illustrating a method for signal sub-layer information for a scalable layer in a picture encoding/decoding structure, which supports a scalable bitstream (hierarchical bitstream) according to an embodiment of the present invention.

The method of FIG. 6 may be performed by the picture encoding apparatus of FIG. 1 or the picture decoding apparatus of FIG. 2. In FIG. 6, a process of signaling sub-layer information on the scalable layer performed by the decoding apparatus is described for easy description.

Referring to FIG. 6, the decoding apparatus receives a bitstream including a plurality of layers (S600).

In this case, the plurality of layers may include a base layer and at least one enhancement layer.

The decoding apparatus acquires information on the maximum number of sub-layers for the plurality of respective layers by decoding the received bitstream (S610).

The information on the maximum number of sub-layers is included in at least one of video parameter set extension information, a video parameter set, and a sequence parameter set to be signaled. The video parameter set extension information may be a VPS extension syntax.

The method of signaling the information on the maximum number of sub-layers by using the video parameter set extension information, the video parameter set, and the sequence parameter set has been described in detail with reference to Tables 5, and Tables 9 to 13.

As one example, the decoding apparatus may be acquired from the information on the maximum number of sub-layers for each of the plurality of layers from the video parameter set extension information. In this case, the decoding apparatus acquires flag information representing whether the information on the maximum number of sub-layers is present in the video parameter set extension information to find the maximum number of sub-layers for each of the plurality of layers.

As another example, the decoding apparatus may acquire information on the maximum number of sub-layers of a corresponding layer from the video parameter set extension information for a layer in which the maximum number of sub-layers signaled in the video parameter set extension information is different from the maximum number of sub-layers signaled in the video parameter set. In this case, the decoding apparatus acquires flag information representing whether the maximum number of sub-layers signaled in the video parameter set extension information is equal to the maximum number of sub-layers signaled in the video parameter set to determine the maximum number of sub-layers for the corresponding layer.

As yet another example, the decoding apparatus may acquire the information on the maximum number of sublayers for each of the plurality of layers from the sequence parameter set. That is, the decoding apparatus may acquire information on the maximum number of sub-layers of a corresponding layer from the sequence parameter set corresponding to each of the base layer or the enhancement layer.

As yet another example, the decoding apparatus may acquire information on the maximum number of sub-layers of a corresponding layer from the sequence parameter set when the maximum number of sub-layers signaled in the video parameter set is not equal to the maximum number of sub-layers signaled in the sequence parameter set of each of the plurality of layers (base layer or enhancement layer). In this case, the decoding apparatus acquires flag information representing whether the maximum number of sub-layers signaled in the video parameter set is equal to the maximum number of sub-layers signaled in the sequence parameter set to determine the maximum number of sub-layers for the corresponding layer. The flag information may be signaled in the case of the enhancement layer.

For example, when the flag information represents that the maximum number of sub-layers signaled in the video parameter set is equal to the maximum number of sub-layers signaled in the sequence parameter set, the maximum number of sub-layers for the corresponding layer (enhancement layer) may be decided as the maximum number of sub-layers signaled in the video parameter set. On the contrary, when the flag information represents that the maximum number of sub-layers signaled in the video parameter set is not equal to the maximum number of sub-layers signaled in the sequence parameter set, the maximum number of sub-layers for the corresponding layer (enhancement layer) may be decided as information signaled in the sequence parameter set.

Steps S600 to S610 described in detail may be performed by an entropy decoding unit, parsing unit or decoding unit of the decoding apparatus.

Further, when the method of signaling sub-layer information for the scalable layer is performed by the encoding apparatus in a picture encoding/decoding structure that supports the scalable bitstream (hierarchical bitstream), the method may be performed in a procedure opposite to the procedure performed by the decoding apparatus.

For example, the encoding apparatus may decide and encode the information on the maximum number of sub-layers for each of the plurality of layers and transmit a bitstream including the encoded maximum number of sub-layers. In this case, as described above, the information on the maximum number of sub-layers is stored in at least one of the video parameter set extension information, the video parameter set, and the sequence parameter set. The information on the maximum number of sub-layers is encoded by the entropy encoding unit or the encoding unit of the encoding apparatus to be transmitted to the decoding apparatus.

As described in the embodiment of the present invention, the information on the maximum number of sub-layers is signaled for each layer to improve performance and efficiency of a middle box and help performance negotiation or a bitstream extracting process.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

It will be appreciated that various embodiments of the present invention have been described herein for purposes of illustration, and that various modifications, changes, substitutions may be made by those skilled in the art without departing from the scope and spirit of the present invention. Accordingly, the various embodiments disclosed herein are not intended to limit the technical spirit but describe with the true scope and spirit being indicated by the following claims. The scope of the present invention may be interpreted by the appended claims and the technical spirit in the equivalent range are intended to be embraced by the invention.

The invention claimed is:

1. A video decoding method for a video, the video decoding method comprising:
   receiving a bitstream;
   acquiring, from the bitstream, first video information indicating a maximum number of a plurality of temporal sub-layers for the video;
   when a number of a plurality of temporal sub-layers for second video information is determined equal to a maximum number of a plurality of temporal sub-layers for the video indicated by the first video information, acquiring, from the bitstream, the second video information comprising maximum DPB size information and maximum latency information applied to the video according to the first video information;
   acquiring a residual block of a current block by decoding the bitstream; and
   generating a reconstructed block of the current block using the residual block,
   wherein a video parameter set comprises the first video information.

2. The video decoding method of claim 1, wherein the first video information is acquired in accordance with flag information representing whether the first video information is present.

3. The video decoding method of claim 1, wherein the acquiring of the first video information comprises acquiring the information on the maximum number of sub-layers for a layer in which the maximum number of sub-layers signaled in the video parameter extension information is different from the maximum number of sub-layers signaled in a video parameter set.

4. The video decoding method of claim 3, wherein the acquiring of the first video information further comprises acquiring the first video information based on flag information representing whether the maximum number of sub-layers signaled in the video parameter extension information is equal to the maximum number of sub-layers signaled in the video parameter set.

5. A video encoding method for a video, the video encoding method comprising:
   determining first video information indicating a maximum number of a plurality of temporal sub-layers for the video;
   when a number of a plurality of temporal sub-layers for second video information is determined equal to a maximum number of a plurality of temporal sub-layers for the video indicated by the first video information, determining the second video information comprising maximum DPB size information and maximum latency information applied to the video according to the first video information;

acquiring a reconstructed block of a current block;

acquiring a residual block of the current block using the reconstructed block; and transmitting a bitstream comprising the first video the information and the second video information, and information on the residual block by encoding the residual block, wherein a video parameter set comprises the first video information.

6. The video encoding method of claim 5, further comprising determining flag information representing whether the first video information is present.

7. The method of claim 5, wherein the acquiring of the first video information comprises determining the first video information in which the maximum number of sub-layers signaled in the video parameter extension information is different from the maximum number of sub-layers signaled in a video parameter set.

8. A non-transitory computer-readable storage medium storing a bitstream, wherein the bitstream is generated by a video encoding method for a video and comprises:

determining first video information indicating a maximum number of a plurality of temporal sub-layers for the video;

determining second video information comprising maximum DPB size information and maximum latency information applied to the video; and acquiring information on a residual block of a current block, wherein, when a number of a plurality of temporal sub-layers for the second video information is determined equal to a maximum number of a plurality of temporal sub-layers for the video, the second video information is determined according to the first video information, the information on the residual block of the current block is determined by encoding the residual block, and wherein a video parameter set comprises the first video information.

\* \* \* \* \*